United States Patent
Yonenaga et al.

(10) Patent No.: US 9,326,049 B2
(45) Date of Patent: Apr. 26, 2016

(54) MULTI-FLOW OPTICAL TRANSCEIVER, MULTI-FLOW OPTICAL TRANSPONDER AND MULTI-FLOW OPTICAL NODE

(75) Inventors: Kazushige Yonenaga, Yokosuka (JP); Hidehiko Takara, Yokosuka (JP); Masahiko Jinno, Yokosuka (JP); Kohki Shibahara, Yokosuka (JP); Takashi Goh, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 46 days.

(21) Appl. No.: 14/119,359

(22) PCT Filed: Jul. 18, 2012

(86) PCT No.: PCT/JP2012/068237
§ 371 (c)(1),
(2), (4) Date: Nov. 21, 2013

(87) PCT Pub. No.: WO2013/012015
PCT Pub. Date: Jan. 24, 2013

(65) Prior Publication Data
US 2014/0126905 A1 May 8, 2014

(30) Foreign Application Priority Data
Jul. 19, 2011 (JP) ................................. 2011-158094

(51) Int. Cl.
*H04J 14/02* (2006.01)
*G02B 6/124* (2006.01)
(Continued)

(52) U.S. Cl.
CPC .......... *H04Q 11/0003* (2013.01); *H04B 10/40* (2013.01); *H04B 10/506* (2013.01);
(Continued)

(58) Field of Classification Search
CPC ............ H04Q 11/0003; H04Q 11/0005; H04J 14/0204; H04J 14/0205; H04J 14/0212
USPC .......................................... 398/48, 45, 44, 42
See application file for complete search history.

(56) References Cited

U.S. PATENT DOCUMENTS 5,870,216 A * 2/1999 Brock et al. ..................... 398/49
6,141,127 A * 10/2000 Boivin ..................... H04J 14/02
250/227.12

(Continued)

FOREIGN PATENT DOCUMENTS

EP 2487810 A1 8/2012
EP 2523367 A1 11/2012
(Continued)

OTHER PUBLICATIONS

English translation of International Preliminary Report on Patentability dated Jan. 30, 2014 corresponding to PCT/JP2012/068237, 2 pp.

(Continued)

*Primary Examiner* — Oommen Jacob
(74) *Attorney, Agent, or Firm* — Ohlandt Greeley Ruggiero & Perle L.L.P.

(57) ABSTRACT

A multi-flow optical transceiver provided with a plurality of wavelength-tunable light sources, a plurality of optical modulation units which modulates light with an input signal, an optical multiplexing/demultiplexing switch which couples light from at least one of the wavelength-tunable light sources to at least one of the optical modulation units with any power, and an optical coupling unit which couples a plurality of lights, modulated by a plurality of the optical modulation units, to at least one waveguide.

9 Claims, 35 Drawing Sheets

(51) Int. Cl.
*H04J 14/00* (2006.01)
*H04Q 11/00* (2006.01)
*H04B 10/50* (2013.01)
*H04L 27/26* (2006.01)
*H04B 10/40* (2013.01)

(52) U.S. Cl.
CPC ......... *H04J14/0204* (2013.01); *H04J 14/0205* (2013.01); *H04J 14/026* (2013.01); *H04J 14/0212* (2013.01); *H04J 14/0224* (2013.01); *H04L 27/2697* (2013.01); *H04Q 11/0005* (2013.01); *H04J 14/021* (2013.01); *H04Q 2011/0035* (2013.01)

(56) References Cited

U.S. PATENT DOCUMENTS

| | | | | |
|---|---|---|---|---|
| 6,429,955 | B1* | 8/2002 | Suemura | H04Q 11/0001 398/48 |
| 6,829,401 | B2* | 12/2004 | Duelk | H04Q 11/0005 385/16 |
| 8,200,047 | B1* | 6/2012 | Kowalczyk | G02B 6/12004 385/1 |
| 2002/0093707 | A1* | 7/2002 | Katagiri | H04J 14/0206 398/85 |
| 2007/0223924 | A1* | 9/2007 | Goto | H04B 10/506 398/79 |
| 2009/0180778 | A1* | 7/2009 | Rhee | H04B 10/548 398/79 |
| 2009/0324226 | A1* | 12/2009 | Buchali et al. | 398/76 |
| 2010/0027994 | A1* | 2/2010 | Xu | H04B 10/548 398/43 |
| 2010/0119229 | A1* | 5/2010 | Roelkens | G02B 6/12007 398/79 |
| 2010/0183309 | A1* | 7/2010 | Etemad | H04B 10/505 398/79 |
| 2011/0293279 | A1* | 12/2011 | Lam | H04J 14/0279 398/79 |
| 2012/0128368 | A1 | 5/2012 | Onohara et al. | |
| 2012/0148261 | A1* | 6/2012 | Yu | H04B 10/548 398/193 |
| 2012/0224851 | A1 | 9/2012 | Takara et al. | |
| 2012/0281988 | A1 | 11/2012 | Kikuchi | |
| 2013/0322809 | A1* | 12/2013 | Goh | H04B 10/5161 385/3 |
| 2014/0126905 | A1* | 5/2014 | Yonenaga et al. | 398/48 |

FOREIGN PATENT DOCUMENTS

| | | |
|---|---|---|
| JP | 217454 | 9/2010 |
| JP | 2011135497 A | 7/2011 |
| WO | 2011043398 A1 | 4/2011 |
| WO | 2011083575 A1 | 7/2011 |

OTHER PUBLICATIONS

English translation of Written Opinion of the International Searching Authority dated Jan. 30, 2014 corresponding to PCT/JP2012/068237, 5 pp.

Jinno, et al, "Spectrum-Efficient and Scalable Elastic Optical Path Network: Architecture, Benefits, and Enabling Technologies", IEEE Communications Magazine, Nov. 2009, pp. 66-73, 8 pp.

Yamamoto, et al., "Optical Frequency Comb Generation Using Phase Modulators and Group Velocity Dispersion Medium"; 2006 Asia-Pacific Microwave Photonics Conference Technical Digest, pp. 225-227, 3 pp.

Goh, et al., "Multi-Carrier Flexible-Format Optical Modulator Using PLC-LN Hybrid Intergration Technology", IEICE Technical Report 2011, pp. 53-55, 15 pp.

Goh, et al., "Novel Flexible-Format Optical Modulator With Selectable Combinations of Carrier Numbers and Modulation Levels Based on Silica-PLC and LiNbO3 Hybrid Intergration", Optical Society of America, 2011, 3 pp.

Jinno, et al.,"Distance-Adaptive Spectrum Resource Allocation in Spectrum-Sliced Elastic Optical Path Network", IEEE Communications Magazine, Aug. 2010, pp. 138-145, 8 pp.

Jinno, et al.,"Dynamic and Bandwidth-Scalable Optical Network Architecture and Its Supporting Technologies", vol. J93-B No. 3 pp. 403-411, 2010, 11 pp.

* cited by examiner

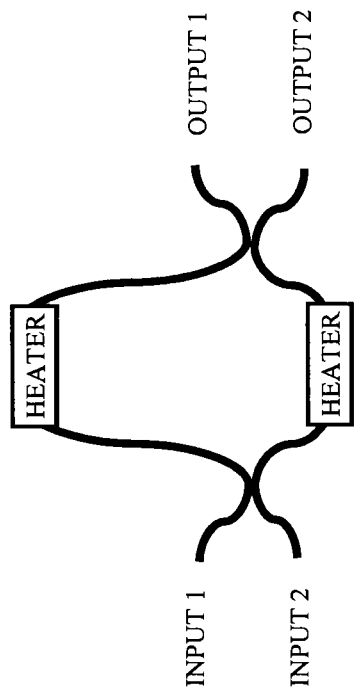
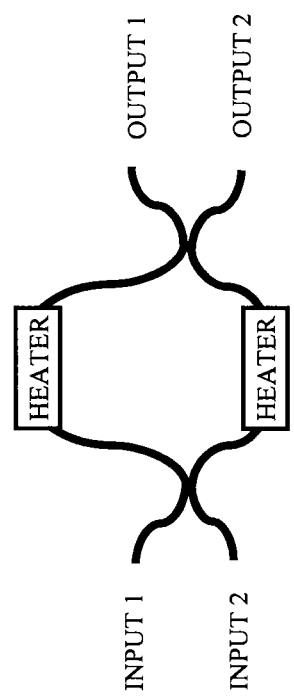
FIG.6 (a)
FIG.6 (b)

VWLS: VARIABLE WAVELENGTH LIGHT SOURCE
VMD: VARIABLE MULTIPLEXER / DEMULTIPLEXER
OM: OPTICAL MODULATOR
MCG: MULTIPLE CARRIER GENERATING PORTION

VWLS: VARIABLE WAVELENGTH LIGHT SOURCE
VMD: VARIABLE MULTIPLEXER / DEMULTIPLEXER
OVM: OPTICAL VECTOR MODULATOR

VWLS: VARIABLE WAVELENGTH LIGHT SOURCE
VMD: VARIABLE MULTIPLEXER / DEMULTIPLEXER
OVM: OPTICAL VECTOR MODULATOR
MCG: MULTIPLE CARRIER GENERATING PORTION

VWLS: VARIABLE WAVELENGTH LIGHT SOURCE
VMD: VARIABLE MULTIPLEXER / DEMULTIPLEXER
OVM: OPTICAL VECTOR MODULATOR
MCG: MULTIPLE CARRIER GENERATING PORTION

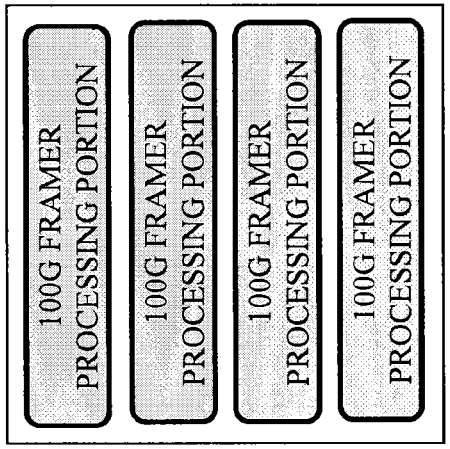
FIG.32 (a) 400G FRAMER X 1
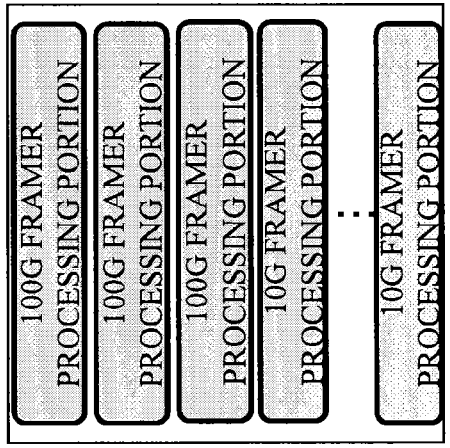
FIG.32 (b) 100G FRAMER X 4
FIG.32 (c) 100G FRAMER X 2
40G FRAMER X 5
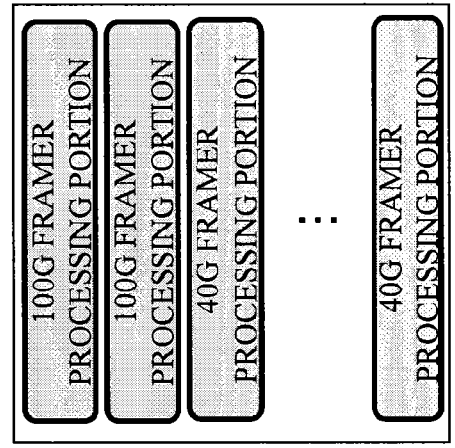
FIG.32 (d) 100G FRAMER X 3
10G FRAMER X 10

MULTI-FLOW OPTICAL TRANSCEIVER, MULTI-FLOW OPTICAL TRANSPONDER AND MULTI-FLOW OPTICAL NODE

BACKGROUND

1. Field of the Disclosure

The present disclosure relates to a multi-flow optical transceiver constituting a wavelength division multiplex (WDM) network and a multi-flow optical transponder and multi-flow optical node using the same. More specifically, the present disclosure relates to a multi-flow optical transceiver which can set a plurality of variable paths through which an optical signal is transmitted in addition to having a function of varying a wavelength, a bit rate, a modulation method, and a signal bandwidth, and a multi-flow optical transponder and multi-flow optical node using the same.

2. Discussion of the Background Art

An optical communication network realizes various functions such as a reconfigurable optical add/drop multiplexer (ROADM) and wavelength cross connect by using a wavelength division multiplex (WDM) technique. Moreover, a colorless function in which an add/drop port does not depend on a wavelength and a directionless function capable of transmitting a signal to all paths without changing the add/drop port can be realized by using a wavelength-tunable transceiver and a wavelength selective switch (WSS). Since the wavelength-tunable transceiver can significantly reduce the variety in comparison with a fixed wavelength transceiver, in addition to an operational advantage that the number of kinds to be managed can be reduced, the wavelength-tunable transceiver has succeeded in significantly reducing the cost by volume efficiency. Regarding WSS, introduction of WSS is advanced in order to increase the number of paths of an ROADM node. Wavelengths of the wavelength-tunable transceiver and a pass center wavelength of WSS are arranged on a grid specified in ITU-T and at constant intervals of 50 GHz, for example.

Meanwhile, in order to more efficiently contain optical signals having different bit rates or optical signals having different transmission distances from the view point of spectral efficiency, there has been proposed an elastic optical path network in which the optical modulation method and the center frequency intervals of adjacent optical signals are adaptively adjusted according to required conditions of individual signals. In the elastic optical path network, the function of varying the bit rate, the modulation method, and the signal bandwidth are important as well as the wavelength-tunable function of the optical transceiver (for example, see Non-Patent Literatures 1 and 2).

CITATION LIST

Patent Literature

Patent Literature 1: Japanese Patent Laid-Open Publication No. 2010-217454 Non-Patent Literatures
Non-Patent Literature 1: Masahiko JINNO, Hidehiko TAKARA, Bartlomiej Kozicki "Dynamic and Bandwidth-Scalable Optical Network Architecture and Its Supporting Technologies" The Institute of Electronics, Information and Communication Engineers, Japanese Journal Vol. J93-B No. 3, pp. 403-411, 2010.
Non-Patent Literature 2: M. Jinno, H. Takara, B. Kozicki, Y. Tsukishima, Y. Sone, and S. Matsuoka, "Spectrum-Efficient and Scalable Elastic Optical Path Network: Architecture, Benefits, and Enabling Technologies", IEEE Commun. Mag., Vol. 47, Issue 11, pp. 66-73, 2009.
Non-Patent Literature 3: T. Yamamoto, T. Komukai, S. Kawanishi, K. Suzuki and A. Takada, "Optical Frequency Comb Generation Using Phase Modulators and Group Velocity Dispersion Medium", Proceedings of Asia-Pacific Microwave Photonics Conference (AP-MWP 2006), Paper F-1, pp. 225-227, 2006.

However, in a conventional optical transceiver, a necessary bandwidth is required to be collectively secured on a frequency axis and on the same route, and there has been a problem that a bandwidth resource as a network cannot be well utilized. Moreover, since the optical transceiver having the function of varying the bit rate, the modulation method, and the signal bandwidth is designed corresponding to the highest bit rate, even if a required initial bit rate is low, the optical transceiver is required to have a performance capable of generating a high bit-rate signal, so that there has been a problem that an initial introduction cost increases.

The present disclosure has been achieved in view of the above problems, and an object of the present disclosure is to provide a multi-flow optical transceiver, multi-flow optical transponder, and multi-flow optical node, which can well utilize a bandwidth resource as a network and can keep an initial introduction cost down.

SUMMARY

In order to solve the above problem, the multi-flow optical transceiver according to the present disclosure is provided with an optical multiplexing/demultiplexing switch which can couple light from a wavelength-tunable light source to any optical modulation unit with any power.

Specifically, a multi-flow optical transceiver includes: a plurality of wavelength-tunable light sources; a plurality of optical modulation units which modulates light with an input signal; an optical multiplexing/demultiplexing switch which couples light from at least one of the wavelength-tunable light sources to at least one of the optical modulation units with any power; and an optical coupling unit which couples a plurality of lights, modulated by a plurality of the optical modulation units, to at least one waveguide.

Specifically, a multi-flow optical transceiver includes: a multiple carrier generating unit which generates multiple carries arranged at equal frequency intervals; a wavelength separation unit which branches the multiple carriers from the multiple carrier generating unit for each wavelength; a plurality of optical modulation units which modulates light with an input signal; an optical multiplexing/demultiplexing switch which couples light, branched by at least one of the wavelength separation unit, to at least one of the optical modulation unit with any power; and an optical coupling unit which couples a plurality of lights, modulated by a plurality of the optical modulation units, to at least one waveguide.

The multi-flow optical transceiver of the present disclosure can output a desired modulation signal by switching the optical multiplexing/demultiplexing switch. Accordingly, the present disclosure can provide a multi-flow optical transceiver which can well utilize a bandwidth resource as a network and can keep an initial introduction cost down.

The multi-flow optical transceiver according to the present disclosure further includes: a digital/analog conversion unit which applies digital/analog conversion to the input signal and inputs the digital/analog converted signal to the optical modulation unit. The multi-flow optical transceiver can increase an input signal without increasing the number of light sources.

The multi-flow optical transceiver according to the present disclosure further includes: at least one multiple carrier generating unit which generates multiple carries, arranged at equal frequency intervals, from light of the wavelength-tunable light source; and a wavelength separation unit Which branches the multiple carriers from the multiple carrier generating unit for each wavelength. The multi-flow optical transceiver can generate an OFDM signal using a multiple carrier light and enlarge a degree of freedom of a modulation signal.

In the multi-flow optical transceiver according to the present disclosure, the optical coupling unit is a switch with an optical distribution function having a plurality of optical output ports. The multi-flow optical transceiver can efficiently sort signals into a plurality of paths, at the same time, generate signals having the same wavelength, and can transmit the generated signals to different paths.

In the multi-flow optical transceiver according to the present disclosure, the number of the wavelength-tunable light sources is four, the number of the optical modulation units is four, the optical multiplexing/demultiplexing switch includes four input ports, four output ports, and three two-input/two-output variable multiplexers/demultiplexers, the input side of a first variable multiplexer/demultiplexer is connected to a second input port and a third input port, the input side of a second variable multiplexer/demultiplexer is connected to a first input port and one of outputs of the first variable multiplexer/demultiplexer, the input side of a third variable multiplexer/demultiplexer is connected to a fourth input port and the other output of the first multiplexer/demultiplexer, the output side of the second variable multiplexer/demultiplexer is connected to a first output port and a second output port, the output side of the third variable multiplexer/demultiplexer is connected to a third output port and a fourth output port, light from the wavelength-tunable light source or the multiple carriers from the multiple carrier generating unit is coupled to each of the input ports of the optical multiplexing/demultiplexing switch, and the optical modulation units are connected to the respective output ports of the optical multiplexing/demultiplexing switch.

A multi-flow optical transponder according to the present disclosure includes: at least one client interface; a reconfigurable digital signal processing unit connected to the client interface; a parallel-serial/serial-parallel conversion unit which is connected to the digital signal processing unit and in which m:n (m>n, m and n are positive integers); and the multi-flow optical transceiver which is connected to the parallel-serial/serial-parallel conversion unit. Since the multi-flow optical transponder is provided with the multi-flow optical transceiver, the present disclosure can provide a multi-flow optical transponder which can well utilize a bandwidth resource as a network and can keep an initial introduction cost down. The multi-flow optical transponder can efficiently convert client signals having various bit rates into optical signals.

A multi-flow optical node according to the present disclosure, includes: the multi-flow optical transponder; and a plurality of wavelength selective switches, wherein the number of output ports of the multi-flow optical transponder or the number of output ports of the optical branching units connected to the output port of the multi-flow optical transponder is the same as the number of the wavelength selective switches, and an output of the multi-flow optical transponder or an output of the optical branching unit is connected to an input of the wavelength selective switch. Since the multi-flow optical transponder is provided with the multi-flow optical transceiver, the present disclosure can provide a multi-flow optical node which can well utilize a bandwidth resource as a network and can keep an initial introduction cost down.

The present disclosure can provide a multi-flow optical transceiver, multi-flow optical transponder, and multi-flow optical node, which can well utilize a bandwidth resource as a network and further keep an initial introduction cost down.

BRIEF DESCRIPTION OF THE DRAWINGS

FIG. 6(a) and FIG. 6(b) are views showing a constitutional example of the variable multiplexer/demultiplexer of the transmission portion of the multi-flow optical transceiver according to the present disclosure.

FIG. 32(a), FIG. 32(b), FIG. 32(c) and FIG. 32(d) are views showing a constitutional example of a multi flexible framer in the multi-flow optical transponder according to the present disclosure.

DETAILED DESCRIPTION OF THE PREFERRED EMBODIMENT

Figure 1:
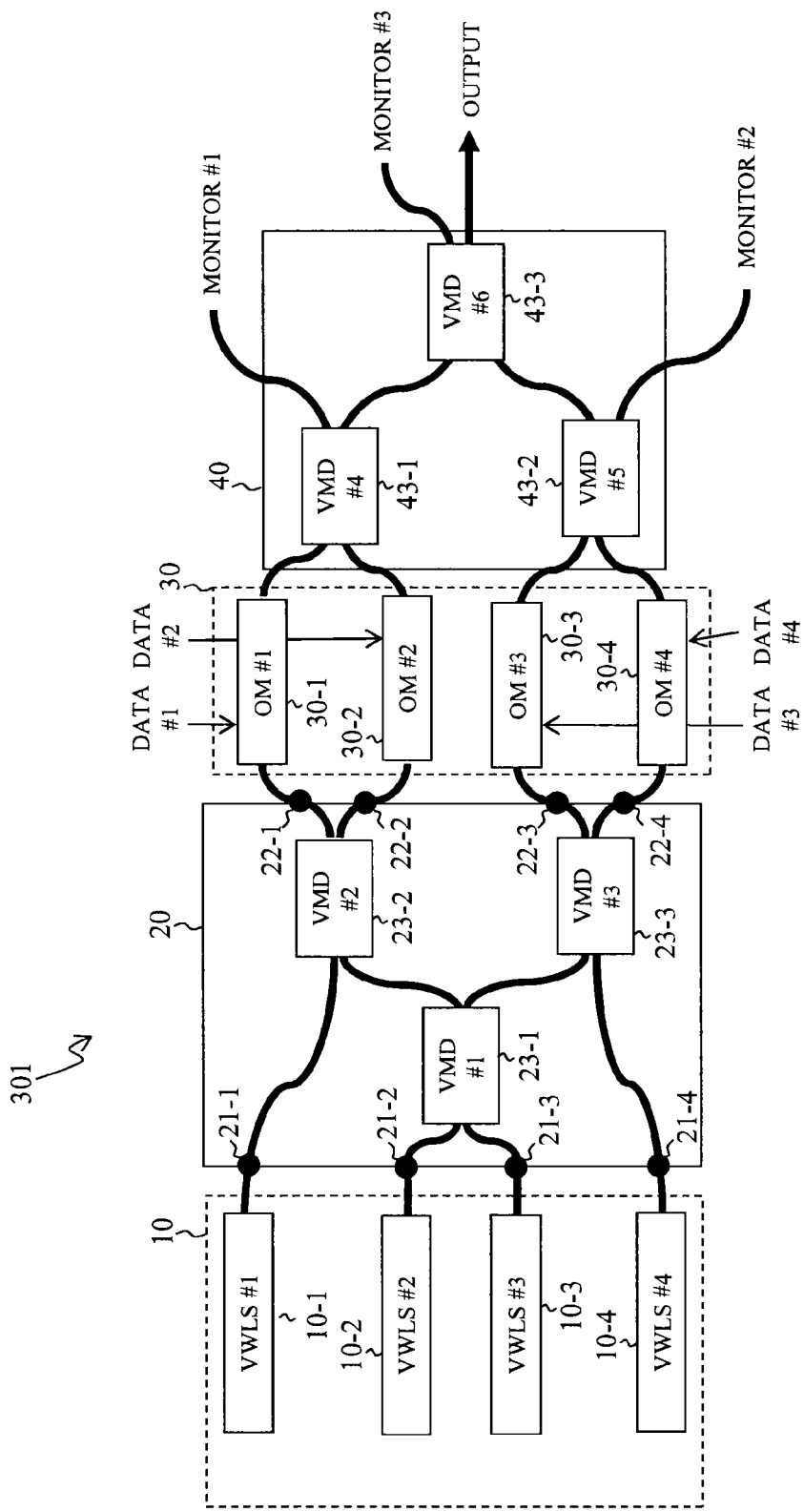
FIG. 1 is a view showing a transmission portion of a multi-flow optical transceiver according to the present disclosure.

Hereinafter, embodiments of the present disclosure will be described in detail with reference to the drawings. When description is performed without a branch number, the description is common to all the branch numbers of a reference numeral concerned.

Embodiment 1

FIG. 1 is a view for explaining an optical transmission portion 301 of a multi-flow optical transceiver of this embodiment. The optical transmission portion 301 of the multi-flow optical transceiver is provided with a plurality of wavelength-tunable light sources 10, a plurality of optical modulation units 30 modulating light with an input signal, an optical multiplexing/demultiplexing switch 20 coupling the light from at least one of the wavelength-tunable light sources 10 to at least one of the optical modulation units 30 with arbitrary power, and a light coupling unit 40 coupling a plurality of lights, modulated by the plurality of optical modulation units 30 to at least one waveguide.

More specifically, the optical transmission portion 301 of the multi-flow optical transceiver has four wavelength-tunable light sources 10 (10-1 to 10-4) and four optical modulation units 30 (30-1 to 30-4), and the optical multiplexing/demultiplexing switch 20 includes four input ports (21-1 to 21-4), four output ports (22-1 to 22-4), and three two-input/two-output variable multiplexers/demultiplexers (23-1 to 23-3). The input side of the variable multiplexer/demultiplexer 23-1 is connected to the input ports (21-2 and 21-3). The input side of the variable multiplexer/demultiplexer 23-2 is connected to the input port 21-1 and one of outputs of the variable multiplexer/demultiplexer 23-1. The input side of the variable multiplexer/demultiplexer 23-3 is connected to the input port 21-4 and the other output of the variable multiplexer/demultiplexer 23-1. The output side of the variable multiplexer/demultiplexer 23-2 is connected to the output ports (22-1 and 22-2). The output side of the variable multiplexer/demultiplexer 23-3 is connected to the output ports (22-3 and 22-4). The respective lights from the wavelength-tunable light sources (10-1 to 10-4) are coupled to the input ports (21-1 to 21-4) of the optical multiplexing/demultiplexing switch 20. The optical modulation units (30-1 to 30-4) are connected to the respective output ports (22-1 to 22-4) of the optical multiplexing/demultiplexing switch 20.

The optical transmission portion 301 of the multi-flow optical transceiver of FIG. 1 is constituted of four wavelength-tunable light sources (10-1 to 10-4), six variable multiplexers/demultiplexers (23-1 to 23-3 and 43-1 to 43-3), and four optical modulators (30-1 to 30-4). In this constitutional example, optical signals of a binary modulation signal×4 carrier, a four-level modulation signal×2 carrier, and a 16-level modulation signal×1 carrier can be selectively generated. FIG. 2(a)-FIG. 2(c) show a specific signal spectrum example in the case where the baud rate is 25 Gbaud. FIG. 2(a) schematically shows an optical spectrum of a 25 Gbit/s binary phase shift keying (BPSK) signal×4 carrier wavelength division multiplexed (WDM) signal, FIG. 2(b) schematically shows an optical spectrum of a 50 Gbit/s quadrature phase shift keying (QPSK) signal×2 carrier WDM, and FIG. 2(c) schematically shows an optical spectrum of a 100 Gbit/s 16 quadrature amplitude modulation (16 QAM) signal. Hereinafter, the operation will be described in detail.

Figure 3:
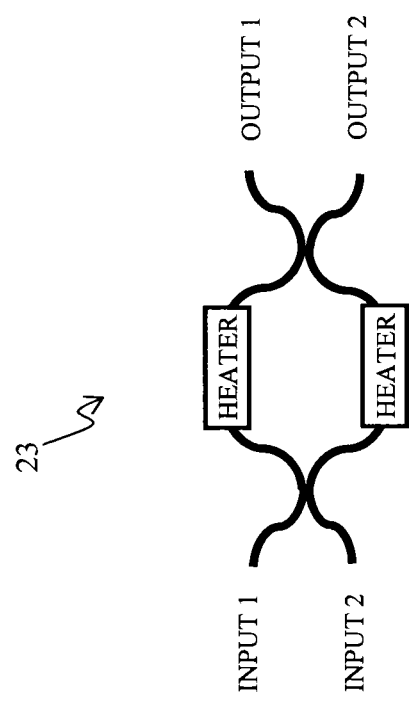
FIG. 3 is a view showing a constitutional example of a variable multiplexer/demultiplexer of the transmission portion of the multi-flow optical transceiver according to the present disclosure.
Figure 4A:
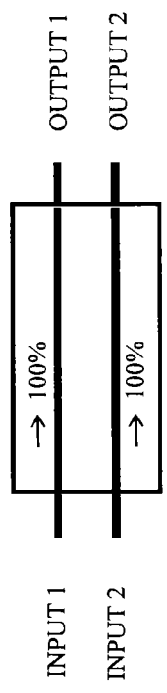
FIG. 4(a), FIG. 4(b), FIG. 4(c) and FIG. 4(d) are views showing a setting example of the variable multiplexer/demultiplexer of the transmission portion of the multi-flow optical transceiver according to the present disclosure.
Figure 4B:
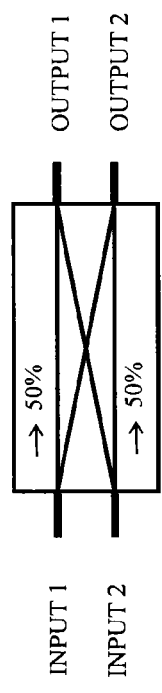
Figure 4C:
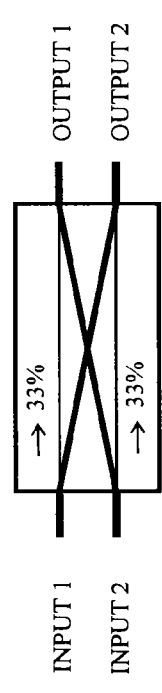
Figure 4D:
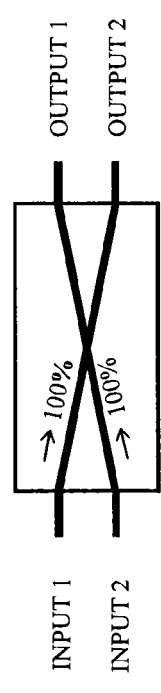

FIG. 3 shows a constitutional example of the variable multiplexer/demultiplexer 23. This constitutional example is a symmetric Mach-Zehnder interferometer (MZI) optical switch using a planar lightwave circuit (PLC), and since an optical path length difference is smaller than that of an asymmetric MZI, the frequency selectivity can be effectively ignored in all tunable wavelengths of the wavelength-tunable light source 10 of the present disclosure. In other words, optical switching having no frequency dependency can be realized. A temperature of an optical waveguide is changed by a heater disposed on the optical waveguide, whereby an optical length of the optical waveguide is changed by thermooptic effect, and a distribution ratio and a coupling ratio can be continuously changed.

Although an example of the optical switch using PLC is shown in this embodiment, an optical switch based on another principle such as a Micro Electro Mechanical Systems switch, a Liquid Crystal On Silicon switch, or a Semiconductor Optical Amplifier switch may be used.

Figure 2:
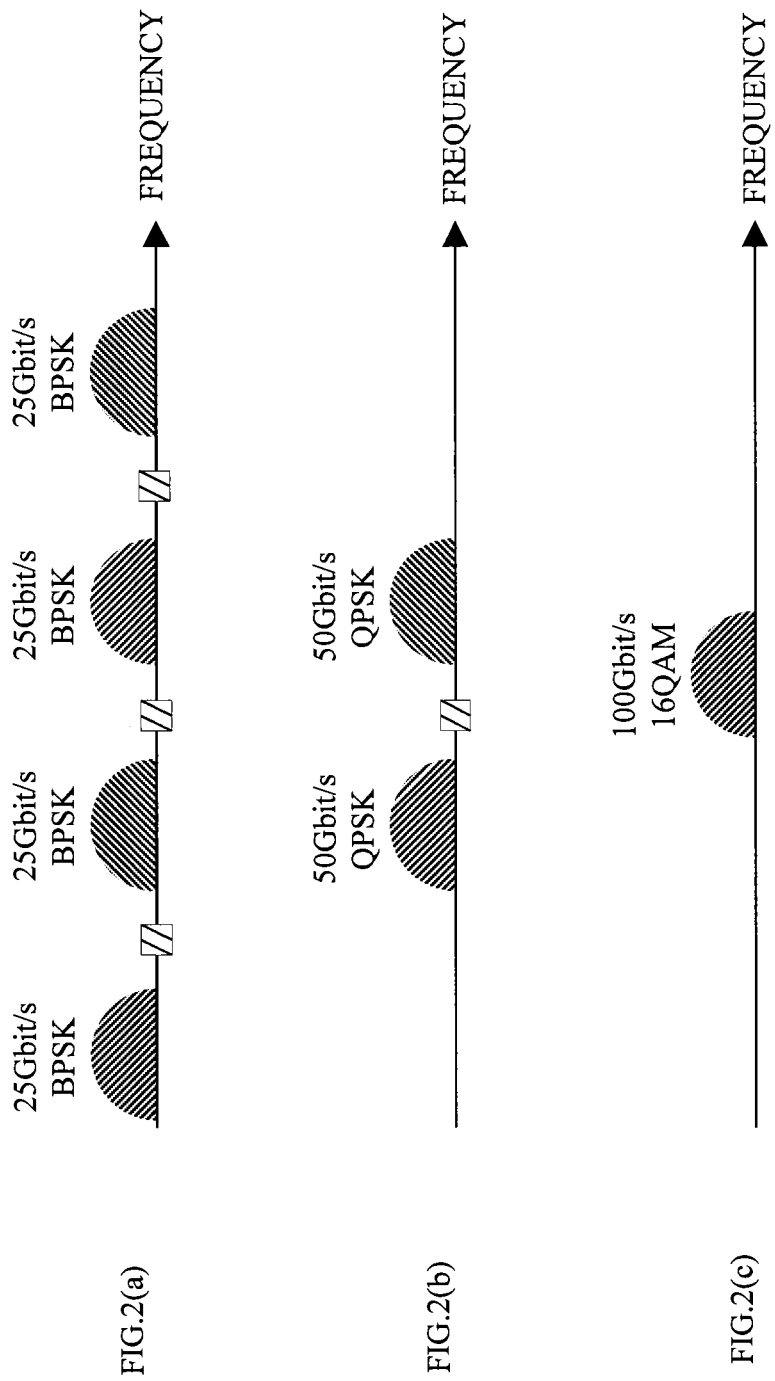
FIG. 2(a), FIG. 2(b) and FIG. 2(c) are views showing an optical signal spectrum example of the transmission portion of the multi-flow optical transceiver according to the present disclosure.

First, there will be considered a case where different binary phase shift keying (BPSK) signals are generated by four optical carries shown in FIG. 2(*a*). For example, as shown in FIG. 4(*a*), three variable multiplexers/demultiplexers (23-1 to 23-3) on the input side of the optical modulator 30 are set. At this time, all the variable multiplexers/demultiplexers (23-1 to 23-3) on the input side of the optical modulator 30 are set in a binary manner so that 100% of input signal power is coupled to either one of output ports. In this case, in the constitutional example shown in FIG. 1, the light from the wavelength-tunable light source 10-1 is coupled to the optical modulator 30-1, the light from the wavelength-tunable light source 10-2 is coupled to the optical modulator 30-2, the light from the wavelength-tunable light source 10-3 is coupled to the optical modulator 30-3, and the light from the wavelength-tunable light source 10-4 is coupled to the optical modulator 30-4. The respective lights are subjected to binary phase shift keying with different data signals. As shown in FIG. 4(*b*), the three variable multiplexers/demultiplexers (43-1 to 43-3) on the output side of the optical modulator 30 are set to be coupled at a power ratio of 1:1, whereby the four optical signals thus modulated are coupled to be output to a single waveguide. At this time, an unused output port of the variable multiplexers/demultiplexers (43-1 to 43-3) can be used as a monitor. A correspondence between the wavelength-tunable light source 10 and the optical modulator 30 can be changed by changing the setting of the three variable multiplexers/demultiplexers (23-1 to 23-3) on the input side of the optical modulator 30. The light from the wavelength-tunable light source 10-1 can be coupled to only the optical modulator 30-1 and the optical modulator 30-2, and the light from the wavelength-tunable light source 10-4 can be coupled to only the optical modulator 30-3 and the optical modulator 30-4; however, this constitution does not limit the form of the optical signal which can be generated in the optical transmission portion 301 of the multi-flow optical transceiver.

Next, there will be considered a case where different quadrature phase shift keying (QPSK) signals are generated by two optical carriers shown in FIG. 2(*b*). For example, the variable multiplexer/demultiplexer 23-1 on the input side of the optical modulator 30 is set as shown in FIG. 4(*a*), and similarly, the two variable multiplexers/demultiplexers (23-2 and 23-3) are set as shown in FIG. 4(*b*). At this time, the variable multiplexers/demultiplexers (23-2 and 23-3) distribute the input light at a power ratio of 1:1. In this case, in the constitutional example shown in FIG. 1, as a light source, the wavelength-tunable light source 10-1 and the wavelength-tunable light source 10-3 are used, for example. Since the wavelength-tunable light source 10-2 and the wavelength-tunable light source 10-4 are not used, they are quenched. The light from the wavelength-tunable light source 10-1 is distributed to the optical modulator 30-1 and the optical modulator 30-2 at a power ratio of 1:1, and the light from the wavelength-tunable light source 10-3 is distributed to the optical modulator 30-3 and the optical modulator 30-4 at a power ratio of 1:1. In the optical modulators (30-1 to 30-4), modulation is performed with different binary data signals, and a BPSK signal is generated. The output of the optical modulator 30-1 and the output of the optical modulator 30-2 are coupled with a phase difference of $\pi/2 \pm N\pi$ (N<<Nmax, Nmax is a wave number of light output within one symbol rate time) at a power ratio of 1:1, whereby a QPSK signal is generated. In the optical modulator 30-3 and the optical modulator 30-4, QPSK signals are generated in a similar manner. Those two QPSK signals are coupled at a power ratio of 1:1 by an optical switch of last-stage, whereby two waves of a 4-level modulated optical signals are generated. The wavelength-tunable light source 10 to be used can be changed by changing setting of the variable multiplexer/demultiplexer 23 on the input side of the optical modulator 30. The light from the wavelength-tunable light source 10-1 can be coupled to only the optical modulator 30-1 and the optical modulator 30-2, and the light from the wavelength-tunable light source 10-4 can be coupled to only the optical modulator 30-3 and the optical modulator 30-4; however, this constitution does not limit the form of the optical signal which can be generated in the optical transmission portion of the multi-flow optical transceiver.

Next, there will be considered a case where a 16 quadrature amplitude modulation (16 QAM) signal is generated by a single optical carrier shown in FIG. 2(*c*). For example, the variable multiplexer/demultiplexer 23-1 on the input side of the optical modulator 30 is set as shown in FIG. 4(*c*), and similarly, the two variable multiplexers/demultiplexers (23-2 and 23-3) are set as shown in FIG. 4(*d*). At this time, all the variable multiplexers/demultiplexers 23 on the input side of the optical modulator 30 is set so as to distribute optical power not in a binary manner but in an analog manner. In this case, in the constitutional example shown in FIG. 1, only the wavelength-tunable light source 10-2 is used as a light source, for example, and since the wavelength-tunable light sources 10-1, 10-3, and 10-4 are not used, they are quenched. In the 16-QAM configuration, the wavelength-tunable light sources 10-2 and 10-3 which can couple light to all the optical modulators (30-1 to 30-4) can be used as light sources. Meanwhile, although the wavelength-tunable light sources 10-1 and 10-4 which cannot always couple light to all the optical modulators (30-1 to 30-4) cannot be used as light sources, this constitution does not limit the form of an optical signal which can be generated in the optical transmission portion 301 of the multi-flow optical transceiver.

Figure 35:
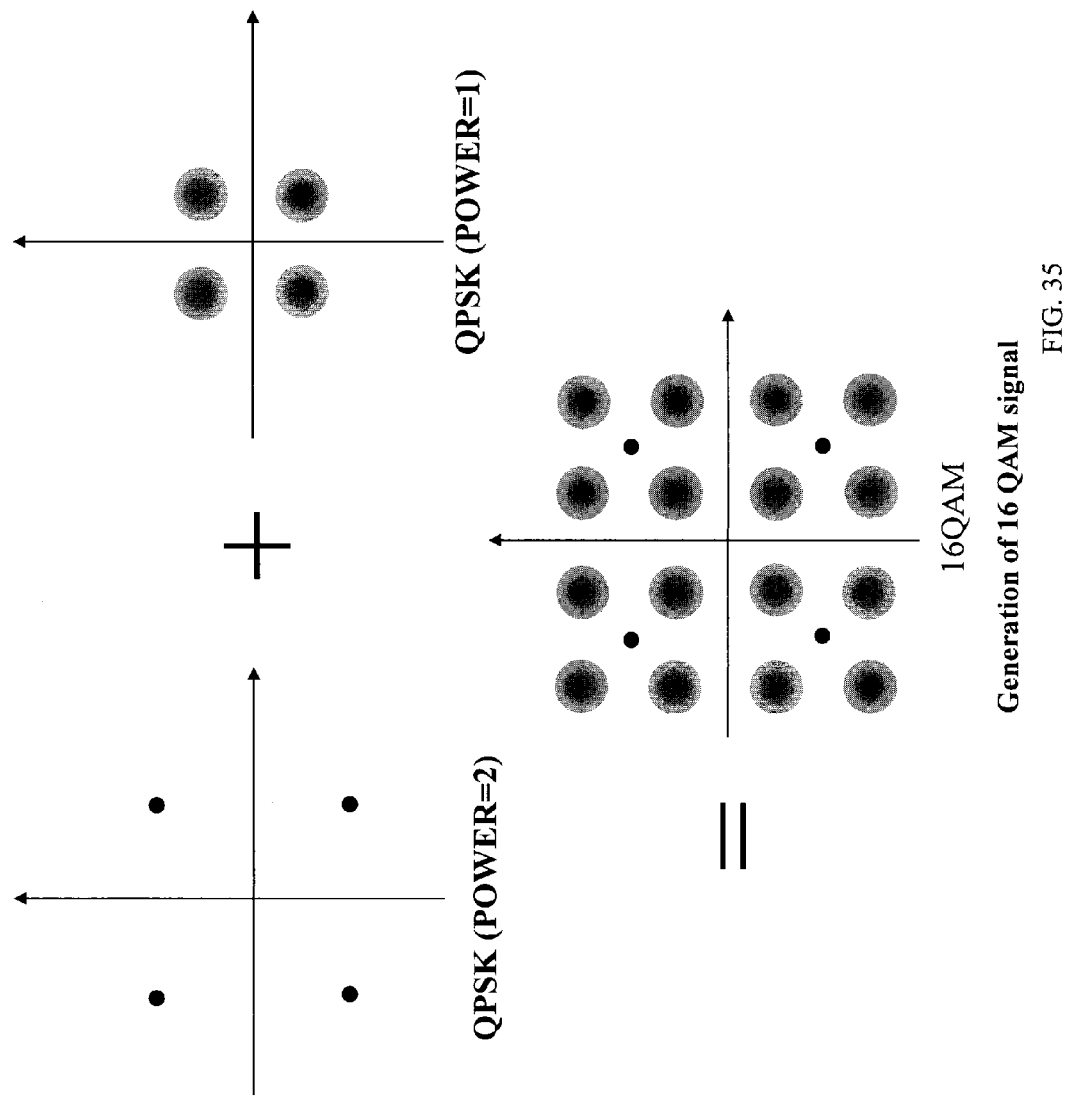
FIG. 35 is a view explaining a procedure for generating a 16 QAM signal in the multi-flow optical transceiver according to the present disclosure.

In the constitutional example shown in FIG. 1, a procedure for generating the 16 QAM signal will be described in detail. First, only the wavelength-tunable light source #2 is lighted, and other light sources are quenched. The power ratio of the variable multiplexer/demultiplexer #1 is set to 2:1, and the power ratios of the variable multiplexers/demultiplexers #2 to #6 are set to 1:1. In the optical modulators #1 and #2, each of the BPSK signals is generated, and the optical phase of the BPSK signal generated in the optical modulator #1 and the optical phase of the BPSK signal generated in the optical modulator #2 are shifted by π/2 to multiplex the signals, whereby the QPSK signal is generated. Although the QPSK signal is similarly generated in the combination of the optical modulator #3 and the optical modulator #4, the power ratio is 2:1. When the QPSK signals with a power ratio of 2:1 are coherently synthesized, the 16 QAM signal is generated as shown in FIG. 35.

In the example in which two QPSK signals are coherently synthesized, although a phase and a polarized wave are not described, explanation is given with a presumption that the phases and the polarized waves are aligned. For example, distances of propagation paths are assumed to be aligned in the wavelength order, and input light is assumed to use a polarization maintaining propagation path having one polarized wave. When the phases and the polarized waves are not aligned, the phases may be aligned by a phase shifter or the like, and the polarized waves may be aligned by a polarized wave controller or the like. For example, the phase shifter and the polarized wave controller may be adjusted so that signal points in an I axis direction and a Q axis direction are arranged at substantially equal intervals while viewing the constellation.

Although the power ratio is set to 2:1 by the variable multiplexer/demultiplexer on the input side of the optical modulator, the power ratio of the variable multiplexer/demultiplexer on the input side of the optical modulator may be set to 1:1 by the variable multiplexer/demultiplexer on the output side. Furthermore, the power ratios on both the input and output sides of the optical modulator may be set to 1:1, and an optical attenuator may be installed on the input or output side, or the optical attenuators may be installed on both the input and output sides, and then the power ratio is set to 2:1 by the optical attenuator. Furthermore, the power ratio may be set to 2:1 by adjusting amplitude of a drive voltage of a modulator.

Second Embodiment

Figure 5:
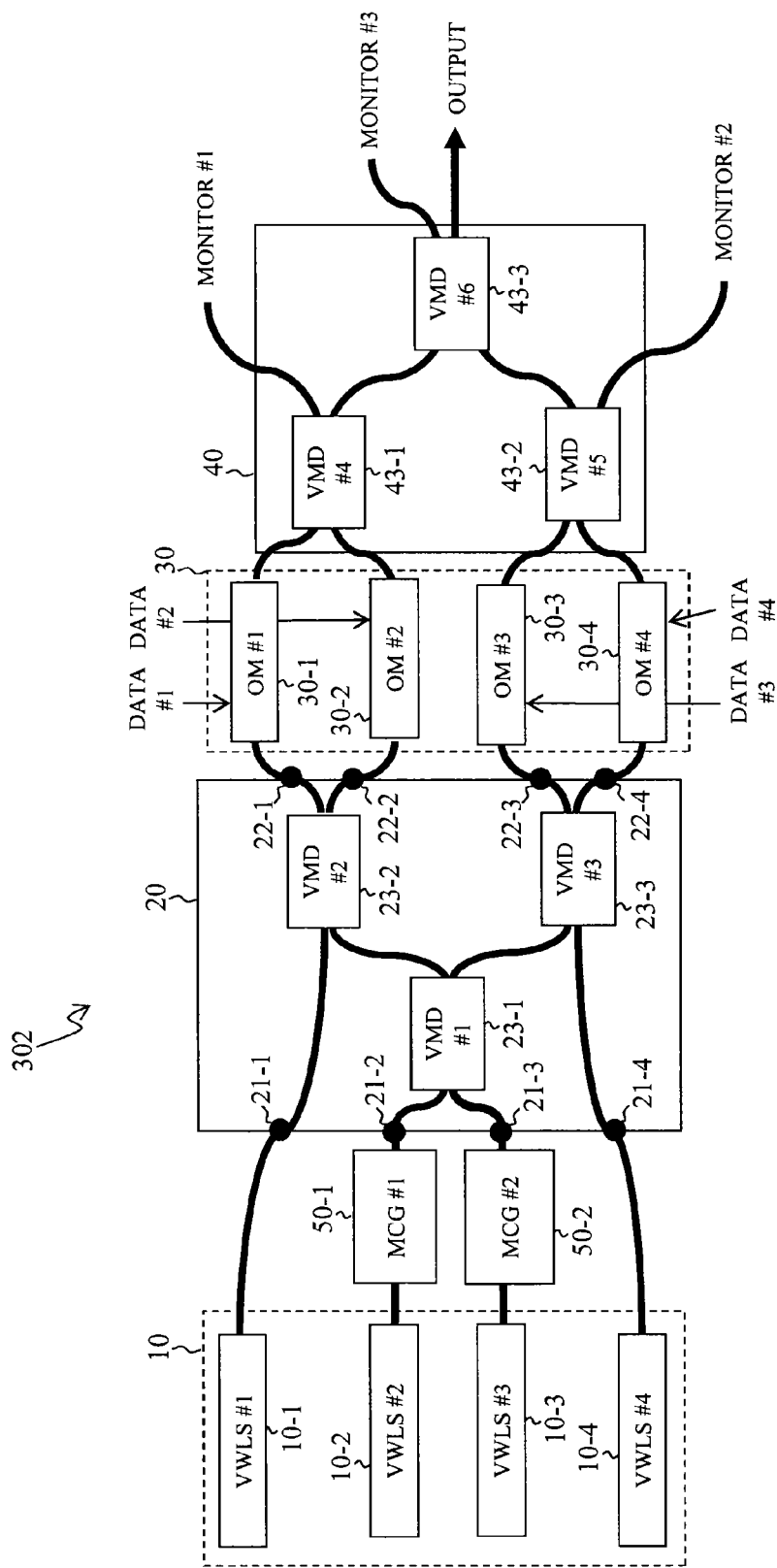
FIG. 5 is a view showing a transmission portion of the multi-flow optical transceiver according to the present disclosure.

FIG. 5 is a view for explaining an optical transmission portion 302 of the multi-flow optical transceiver of this embodiment. The optical transmission portion 302 of the multi-flow optical transceiver corresponds to the optical transmission portion 301 of the multi-flow optical transceiver of FIG. 1 with which at least one multiple carrier generating unit 50 generating multiple carriers with equal frequency intervals from the light of a wavelength-tunable light source 10 and a wavelength separating unit (not shown) branching the multiple carriers from the multiple carrier generating unit 50 for each wavelength are further provided. In the optical transmission portion 302 of the multi-flow optical transceiver, a variable multiplexer/demultiplexer 23 has a function of wavelength separating unit.

In the optical transmission portion 302 of the multi-flow optical transceiver of FIG. 5, a multiple carrier generation portion 50-1 and a multiple carrier generation portion 50-2 are arranged respectively at the output of the wavelength-tunable light source 10-2 and the output of the wavelength-tunable light source 10-3 of the optical transmission portion 301 of the multi-flow optical transceiver of FIG. 1. Further, since the multiple carriers generated in the multiple carrier generating portion 50 are required to be branched for each wavelength, a wavelength selectivity is required for variable multiplexers/demultiplexers (23-1 to 23-3) on the input side of a optical modulator 30. FIG. 6(a)-FIG. 6(b) show a constitutional example of the variable multiplexer/demultiplexer 23 having the wavelength selectivity. In this constitutional example, there is provided an asymmetric MZI optical switch using PLC, the switch has periodical frequency selection characteristics in principle. The period is different depending on an optical length difference between two waveguides and is referred to as a free spectral range (FSR). The FSR is different between the constitutional example shown in FIG. 6(a) and the constitutional example shown in FIG. 6(b), and when a minimum setting value of an optical carrier frequency is represented by Δf, FSR=2Δf and FSR=4Δf in the respective examples. The temperature of the optical waveguide is changed by a heater disposed on the optical waveguide, whereby the optical length of the optical waveguide is changed by a thermooptic effect, and the frequency characteristics can be continuously shifted in parallel in a frequency axis direction. The variable multiplexer/demultiplexer 43 on the output side of the optical modulator 30 is a symmetric MZI optical switch as with the variable multiplexer/demultiplexer 43 of FIG. 1.

In the multiple carrier generating portion 50, plurality of optical carriers whose optical phases are synchronized with each other are collectively generated from input light having a single wavelength. The constitution of the multiple carrier generating portion 50 is described in the Non-Patent Literature 3 and the Patent Literature 1, for example, and multiple carries arranged at equal frequency intervals can be generated.

FIG. 7(a)-FIG. 7(d) show a specific signal spectrum example when the baud rate is 25 Gbaud. In this constitutional example, in addition to the signal spectrum example shown in FIG. 2(a)-FIG. 2(c), it is possible to selectively generate optical signals of FIG. 7(a) a BPSK signal using multiple carrier light×four sub-carrier orthogonal frequency division multiplexing (OFDM), FIG. 7(b) a QPSK signal using the multiple carrier light×two sub-carrier OFDM, FIG. 7(c) a BPSK signal using multiple carrier light×two sub-carrier OFDM×2WDM, and FIG. 7(d) a BPSK signal using multiple carrier light×two sub-carrier OFDM+BPSK signal× 2WDM. In this constitutional example, the variable multiplexer/demultiplexer 23 on the input side of the optical modulator 30 has the wavelength selectivity, whereby the optical OFDM signal using the multiple carrier light can be generated; however, a configurable carrier frequency interval is limited by FSR of the variable multiplexer/demultiplexer 23 on the input side of the optical modulator 30. However, since the wavelength selectivity of the variable multiplexer/demultiplexer 23 is periodic, a configurable wavelength region can cover a wide wavelength variable region of the wavelength-tunable light source 10. Hereinafter, the operation will be described in detail.

Figure 8:
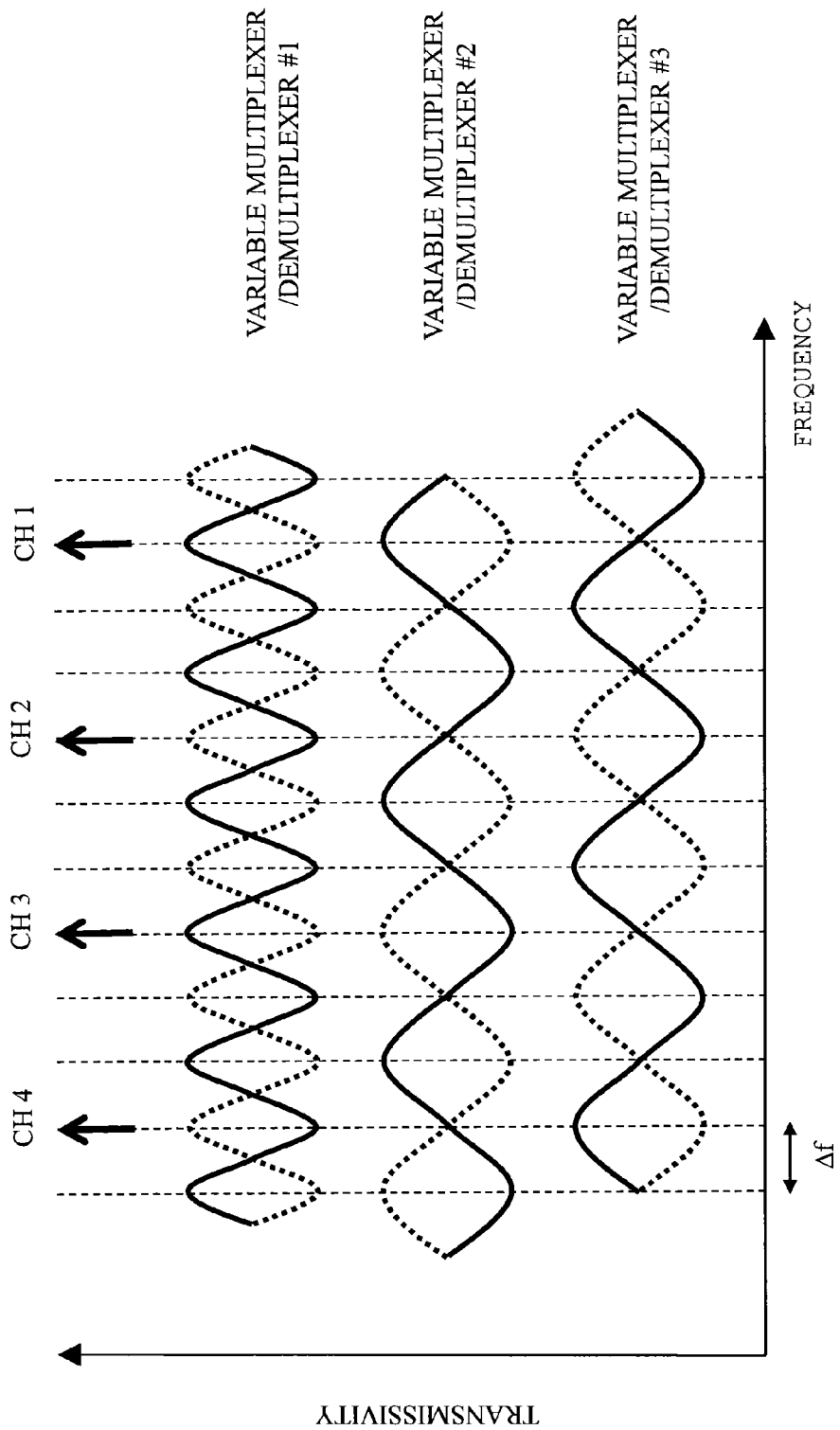
FIG. 8 is a view showing a setting example of the variable multiplexer/demultiplexer of the transmission portion of the multi-flow optical transceiver according to the present disclosure.

First, there will be considered a case where a signal similar to the signal generated in the optical transmission portion 301 of the multi-flow optical transceiver of FIG. 1 is generated. When different BPSK signals are generated by the four optical carries shown in FIG. 2(a), for example, the variable multiplexer/demultiplexer 23 on the input side of the optical modulator 30 is set as shown in FIG. 8. Solid lines and dot lines schematically show the power transmissivity from an input port having an MZI optical switch to two output ports. At this time, the multiple carrier generating portion 50 is set so that input single-wavelength light is output as it is. This case is different from the case of the optical transmission portion 301 of the multi-flow optical transceiver of FIG. 1 in that the wavelength interval that can be set by each of the wavelength-tunable light sources 10 is limited to discrete values because the variable multiplexer/demultiplexer 23 on the input side of the optical modulator 30 has the wavelength selectivity. However, since the wavelength selectivity of the variable multiplexer/demultiplexer 23 is periodic, a configurable wavelength region can cover a wide wavelength variable region of the wavelength-tunable light source 10.

Figure 9:
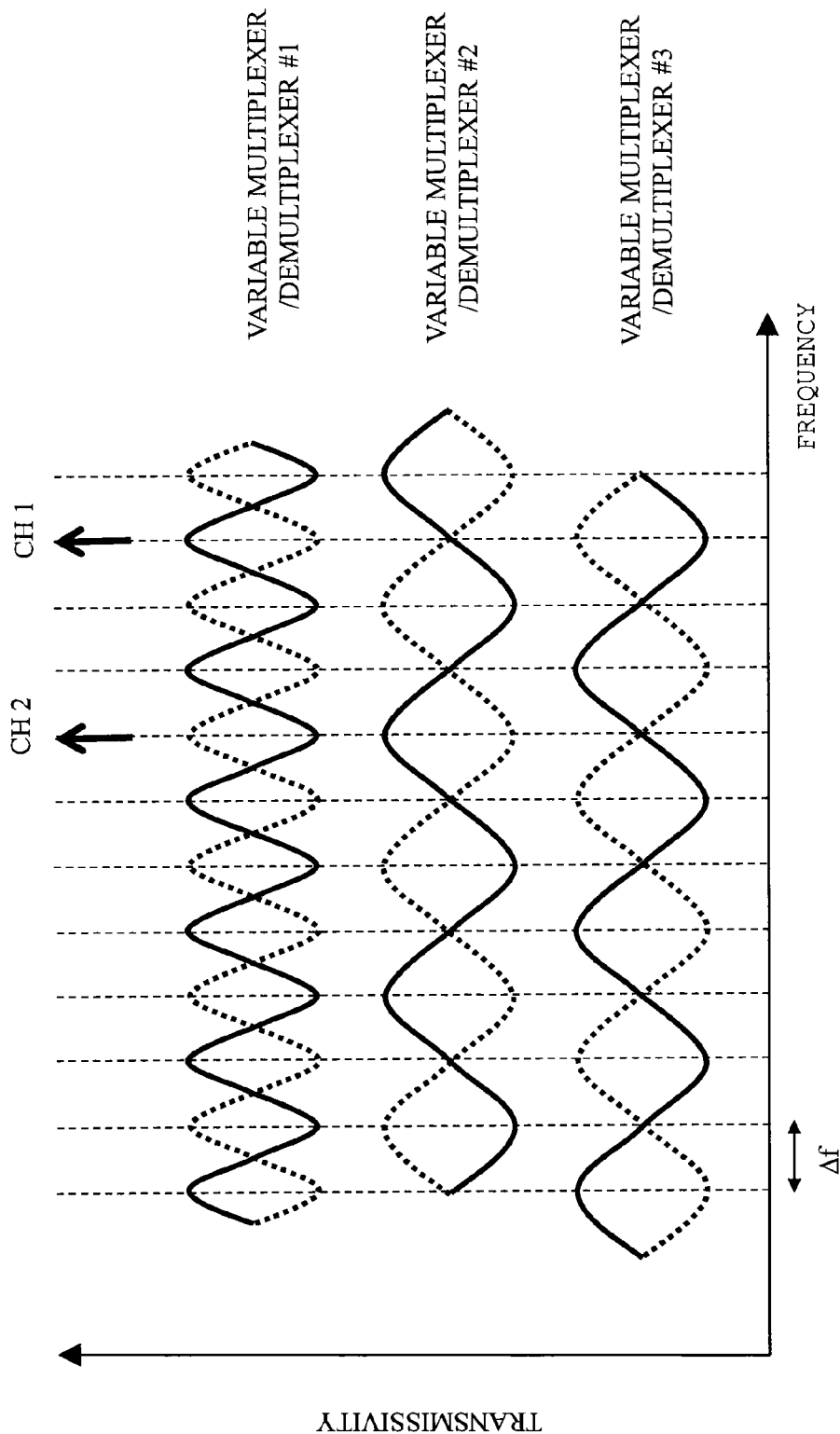
FIG. 9 is a view showing a setting example of the variable multiplexer/demultiplexer of the transmission portion of the multi-flow optical transceiver according to the present disclosure.

When different QPSK signals are generated by the two optical carriers shown in FIG. 2(b), for example, the variable multiplexer/demultiplexer 23 on the input side of the optical modulator 30 is set as shown in FIG. 9. At this time, the multiple carrier generating portion 50 is set so that input single-wavelength light is output as it is. This case is different from the case of the optical transmission portion 301 of the multi-flow optical transceiver of FIG. 1 in that the wavelength interval that can be set by each of the wavelength-tunable light sources 10 is limited to discrete values because the variable multiplexer/demultiplexer 23 on the input side of the optical modulator 30 has the wavelength selectivity. However, since the wavelength selectivity of the variable multiplexer/demultiplexer 23 is periodic, a configurable wavelength region can cover a wide wavelength variable region of the wavelength-tunable light source 10.

Figure 10:
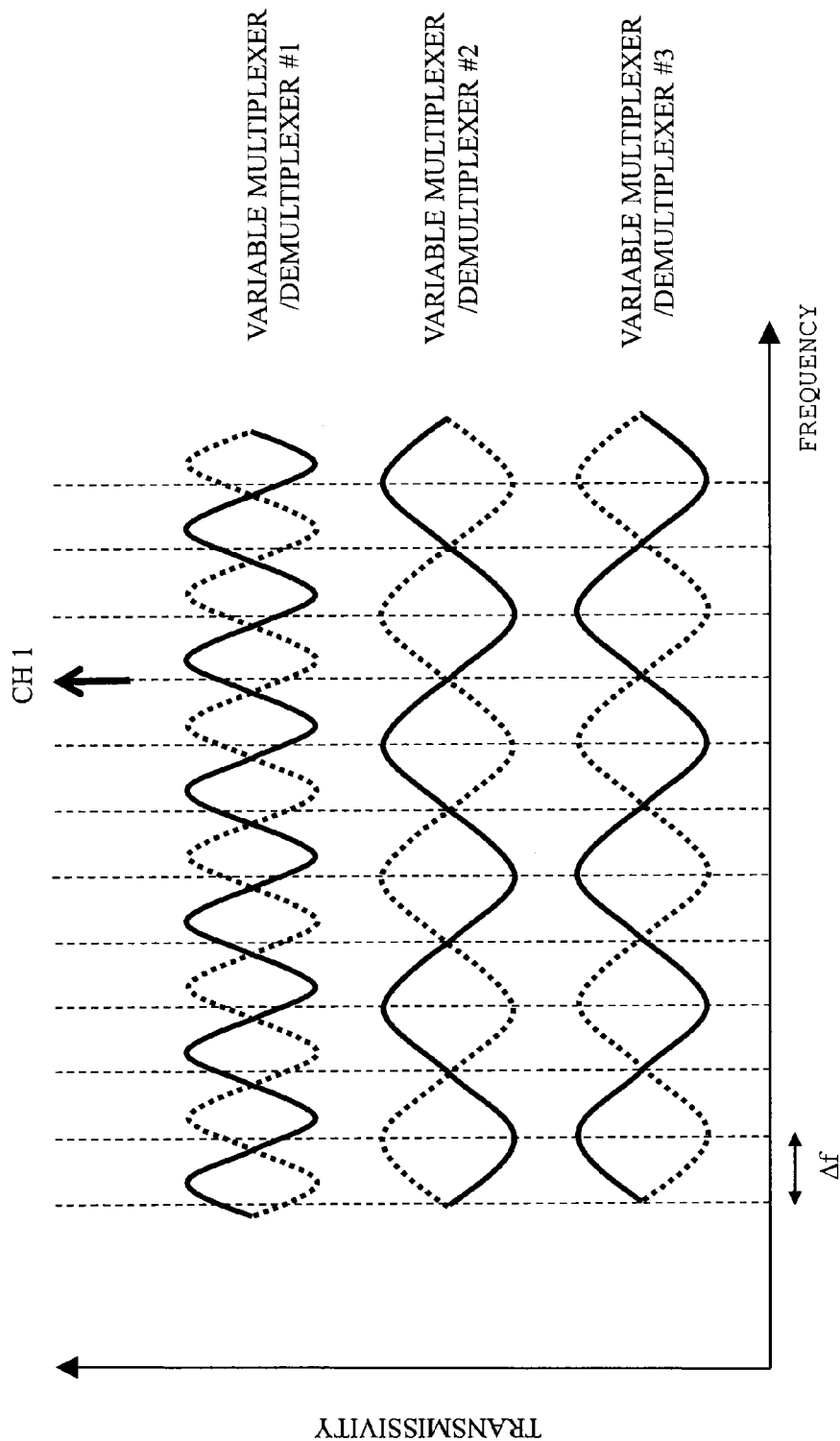
FIG. 10 is a view showing a setting example of the variable multiplexer/demultiplexer of the transmission portion of the multi-flow optical transceiver according to the present disclosure.

When the 16 QAM signal is generated by the optical carrier shown in FIG. 2(c), for example, the variable multiplexer/demultiplexer 23 on the input side of the optical modulator 30 is set as shown in FIG. 10. The variable multiplexer/demultiplexer 23-1 is set to distribute input light at a power ratio of 1:2, and the variable multiplexers/demultiplexers (23-2 and 23-3) are set to distribute input light at a power ratio of 1:1. At this time, the multiple carrier generating portion 50 is set so that input single-wavelength light is output as it is. This case is different from the case of the optical transmission portion 301 of the multi-flow optical transceiver of FIG. 1 in that the wavelength interval that can be set by each of the wavelength-tunable light sources 10 is limited to discrete values because the variable multiplexer/demultiplexer 23 on the input side of the optical modulator 30 has the wavelength selectivity. However, since the wavelength selectivity of the variable multiplexer/demultiplexer 23 is periodic, a configurable wavelength region can cover a wide wavelength variable region of the wavelength-tunable light source 10.

Figure 11:
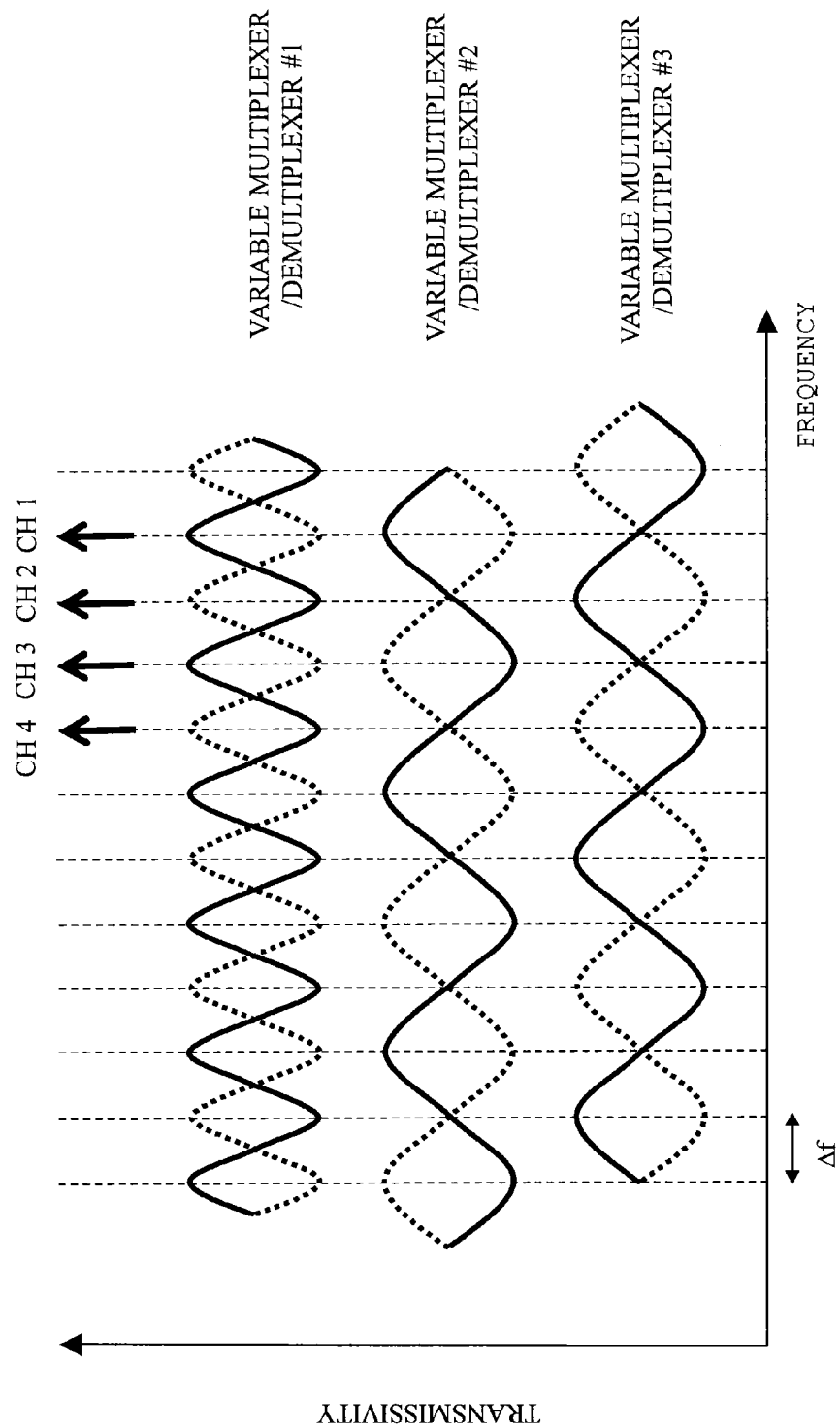
FIG. 11 is a view showing a setting example of the variable multiplexer/demultiplexer of the transmission portion of the multi-flow optical transceiver according to the present disclosure.

Next, there will be considered a case where the BPSK signal using the multiple carrier light×four sub-carrier OFDM signal is generated, as shown in FIG. 7(a). For example, the variable multiplexer/demultiplexer 23 on the input side of the optical modulator 30 is set as shown in FIG. 11. At this time, all the optical multiplexers/demultiplexers on the input side of the optical modulator 30 are set in a binary manner so that 100% of input light is coupled to either one of the output ports. In this case, in the constitutional example shown in FIG. 5, only the wavelength-tunable light source 10-2 is used as a light source, for example, and since the wavelength-tunable light sources 10-1, 10-3, and 10-4 are not used, they are quenched. In this constitution, the wavelength-tunable light sources 10-2 and 10-3 which can couple light to all the optical modulators (30-1 to 30-4) can be used as light sources. In the multiple carrier generating portion 50-1, four optical carriers whose frequency intervals are equal intervals (M) and optical phases are synchronized with each other are generated. As shown in FIG. 11, the four optical carriers are separated by the variable multiplexer/demultiplexer 23-1 of previous stage into each of two waves of optical carriers, that is, an odd numbered (ch 1 and 3) optical carriers and an even numbered (ch 2 and 4) optical carriers, on an optical frequency axis and each optical carriers are input to the variable multiplexers/demultiplexers (23-2 and 23-3) of post-stage. In the post-stage variable multiplexers/demultiplexers (23-2 and 23-3), the two input optical carriers are separated one wave by one wave to the two output ports, respectively. The operation of optical modulation and recombination are similar to that in the case where different binary phase shift keying (BPSK) signals are generated by the four optical carriers. In this constitution, since the variable multiplexer/demultiplexer 23 has the wavelength selectivity, the wavelength interval that can be set by each of the wavelength-tunable light sources 10 is limited to discrete values. However, since the wavelength selectivity of the variable multiplexer/demultiplexer 23 is periodic, a configurable wavelength region can cover a wide wavelength variable region of the wavelength-tunable light source 10.

Figure 12:
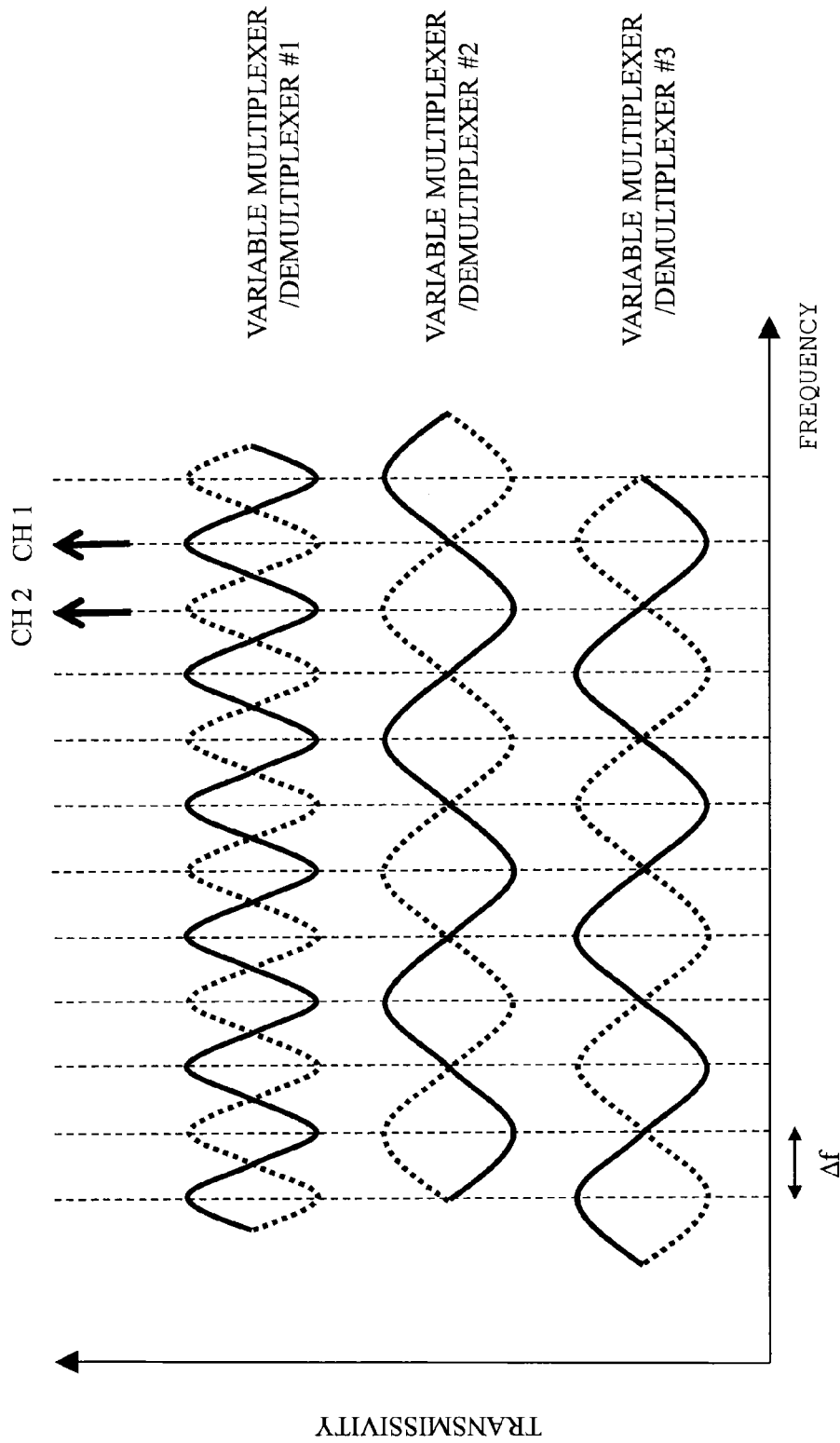
FIG. 12 is a view showing a setting example of the variable multiplexer/demultiplexer of the transmission portion of the multi-flow optical transceiver according to the present disclosure.

Next, there will be considered a case where the QPSK signal×two sub-carrier OFDM signal is generated, as shown in FIG. 7(b). For example, the variable multiplexer/demultiplexer 23 on the input side of the optical modulator 30 is set as shown in FIG. 12. At this time, the variable multiplexers/demultiplexers (23-2 and 23-3) on the input side of the optical modulator 30 are set to distribute input light at a power ratio of 1:1. In this case, in the constitutional example shown in FIG. 5, only the wavelength-tunable light source 10-2 is used as a light source, for example, and since the wavelength-tunable light sources 10-1, 10-3, and 10-4 are not used, they are quenched. In this constitution, the wavelength-tunable light sources 10-2 and 10-3 which can couple light to all the optical modulators (30-1 to 30-4) can be used as light sources. In the multiple carrier generating portion 50-1, two optical carriers whose frequency intervals are $\Delta f$ and optical phases are synchronized with each other are generated. The two optical carriers are separated into a single-wavelength optical carrier by the variable multiplexer/demultiplexer 23-1 of previous stage and input to the variable multiplexers/demultiplexers (23-2 and 23-3) of post-stage. In the post-stage variable multiplexers/demultiplexers (23-2 and 23-3), the input optical carriers are distributed one wave by one wave to the two output ports at a power ratio of 1:1. The operation of optical modulation and recombination are similar to that in the case where different QPSK signals are generated by the two optical carriers. In this constitution, since the variable multiplexer/demultiplexer 23 has the wavelength selectivity, the wavelength interval that can be set by each of the wavelength-tunable light sources 10 is limited to discrete values. However, since the wavelength selectivity of the variable multiplexer/demultiplexer 23 is periodic, a configurable wavelength region can cover a wide wavelength variable region of the wavelength-tunable light source 10.

Figure 13:
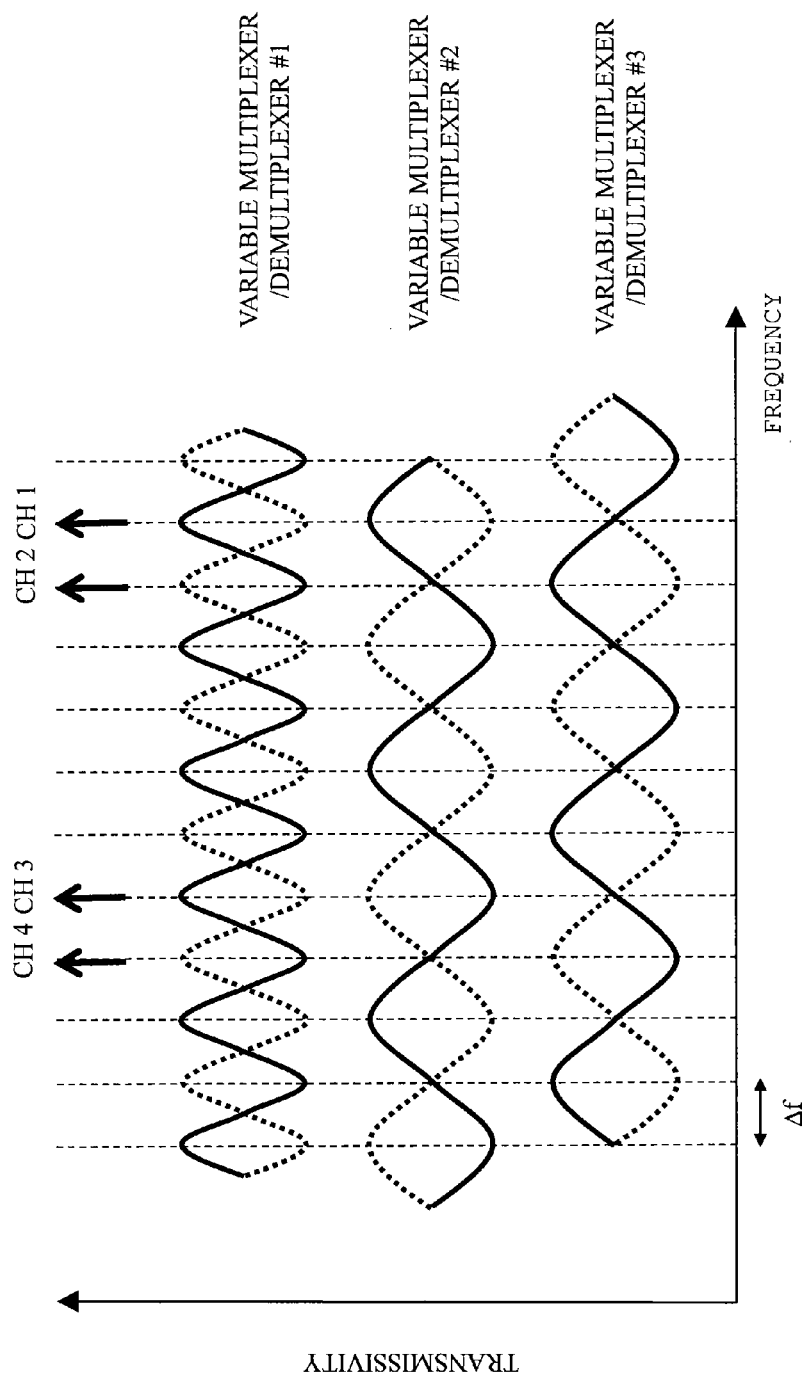
FIG. 13 is a view showing a setting example of the variable multiplexer/demultiplexer of the transmission portion of the multi-flow optical transceiver according to the present disclosure.

Next, there will be considered a case where the BPSK signal×two sub-carrier OFDM×2WDM signal is generated, as shown in FIG. 7(c). For example, the variable multiplexer/demultiplexer 23 on the input side of the optical modulator 30 is set as shown in FIG. 13. At this time, all the variable multiplexers/demultiplexers 23 on the input side of the optical modulator 30 are set in a binary manner so that 100% of input light is coupled to either one of the output ports. In this case, in the constitutional example shown in FIG. 5, the two wavelength-tunable light sources 10-2 and 10-3 are used as light sources, and since the wavelength-tunable light sources 10-1 and 10-4 are not used, they are quenched. In the multiple carrier generating portion 50-1, two optical carriers whose frequency intervals are equal intervals ($\Delta f$) and optical phases are synchronized with each other are generated. Also in the multiple carrier generating portion 50-2, two optical carriers are similarly generated. At this time, the frequency interval of the two carriers generated in the multiple carrier generating portion 50-1 and the frequency interval $\Delta f$ of the two carriers generated in the multiple carrier generating portion 50-2 are set to be equal to FSR of the variable multiplexer/demultiplexer 23-1 of previous stage, and the frequency of the two carriers generated in the multiple carrier generating portion 50-1 and the frequency of the two carriers generated in the multiple carrier generating portion 50-2 are set to be separated by (odd number/2) times of the FSR. The value of FSR that can be taken by the variable multiplexer/demultiplexer 23 is not less than a half of a symbol rate. When the setting is thus performed, two carries generated from the wavelength-tunable light source 10-2 are sorted into either the variable multiplexer/demultiplexer 23-2 connected to the input sides of the optical modulator 30-1 and the optical modulator 30-2 or the variable multiplexer/demultiplexer 23-3 connected to the input sides of the optical modulator 30-3 and the optical modulator 30-4, and both the two carries generated from the wavelength-tunable light source 10-3 are sorted into the variable multiplexer/demultiplexer 23 on the opposite side of the wavelength-tunable light source 10-3. Each of the post-stage variable multiplexers/demultiplexers (23-2 and 23-3) on the input side of the optical modulator 30 separates the two input carries, and only one optical carrier is input to each of the optical modulators 30 and subjected to modulation. The operation of recombination after that is similar to the case of generating different BPSK signals with the four optical carries. In this constitution, since the variable multiplexer/demultiplexer 23 has the wavelength selectivity, the wavelength interval that can be set by each of the wavelength-tunable light sources 10 is limited to discrete values. However, since the wavelength selectivity of the variable multiplexer/demultiplexer 23 is periodic, a configurable wavelength region can cover a wide wavelength variable region of the wavelength-tunable light source 10.

Figure 7:
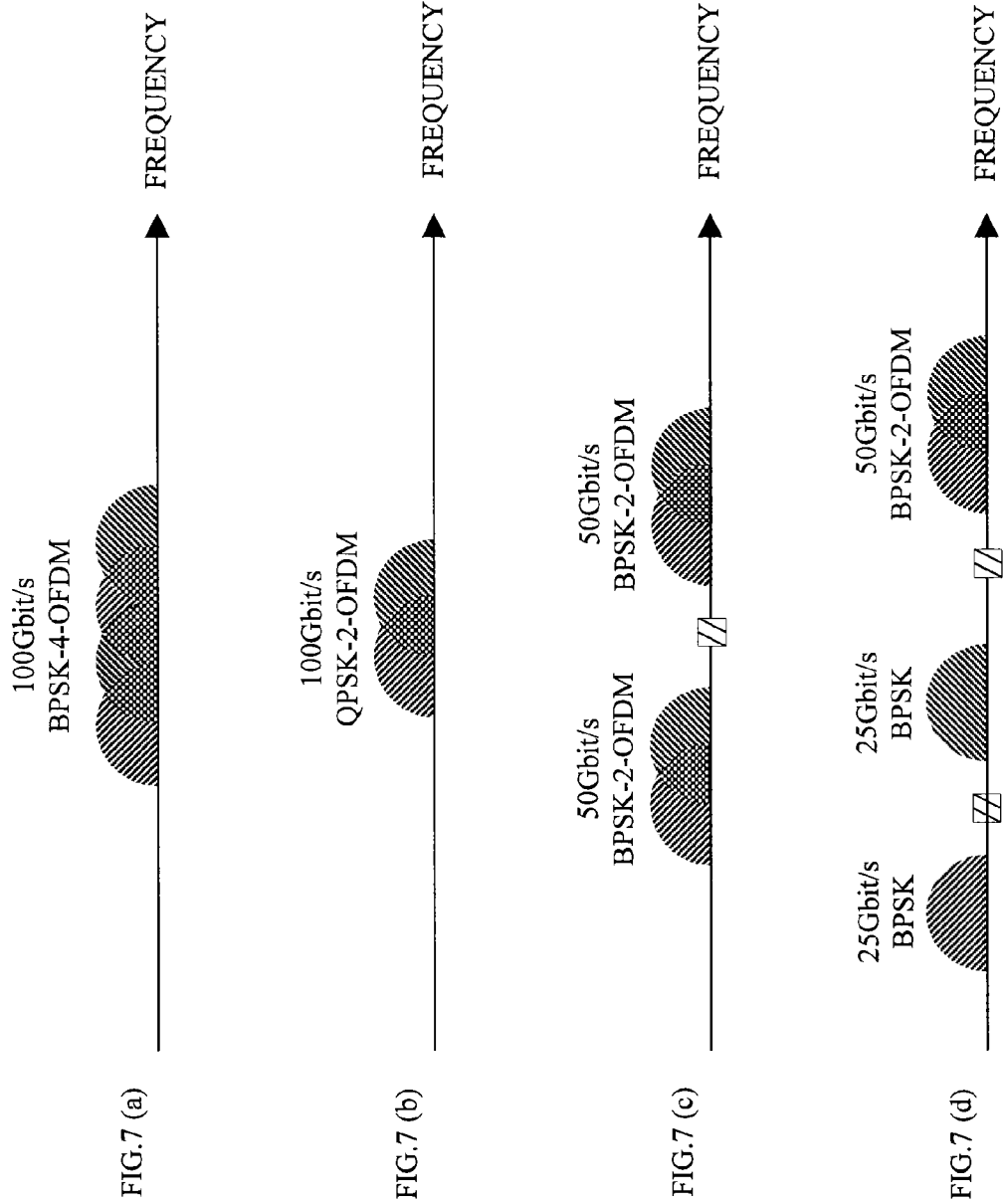
FIG. 7(a), FIG. 7(b), FIG. 7(c) and FIG. 7(d) are views showing an optical signal spectrum example of the transmission portion of the multi-flow optical transceiver according to the present disclosure.
Figure 14:
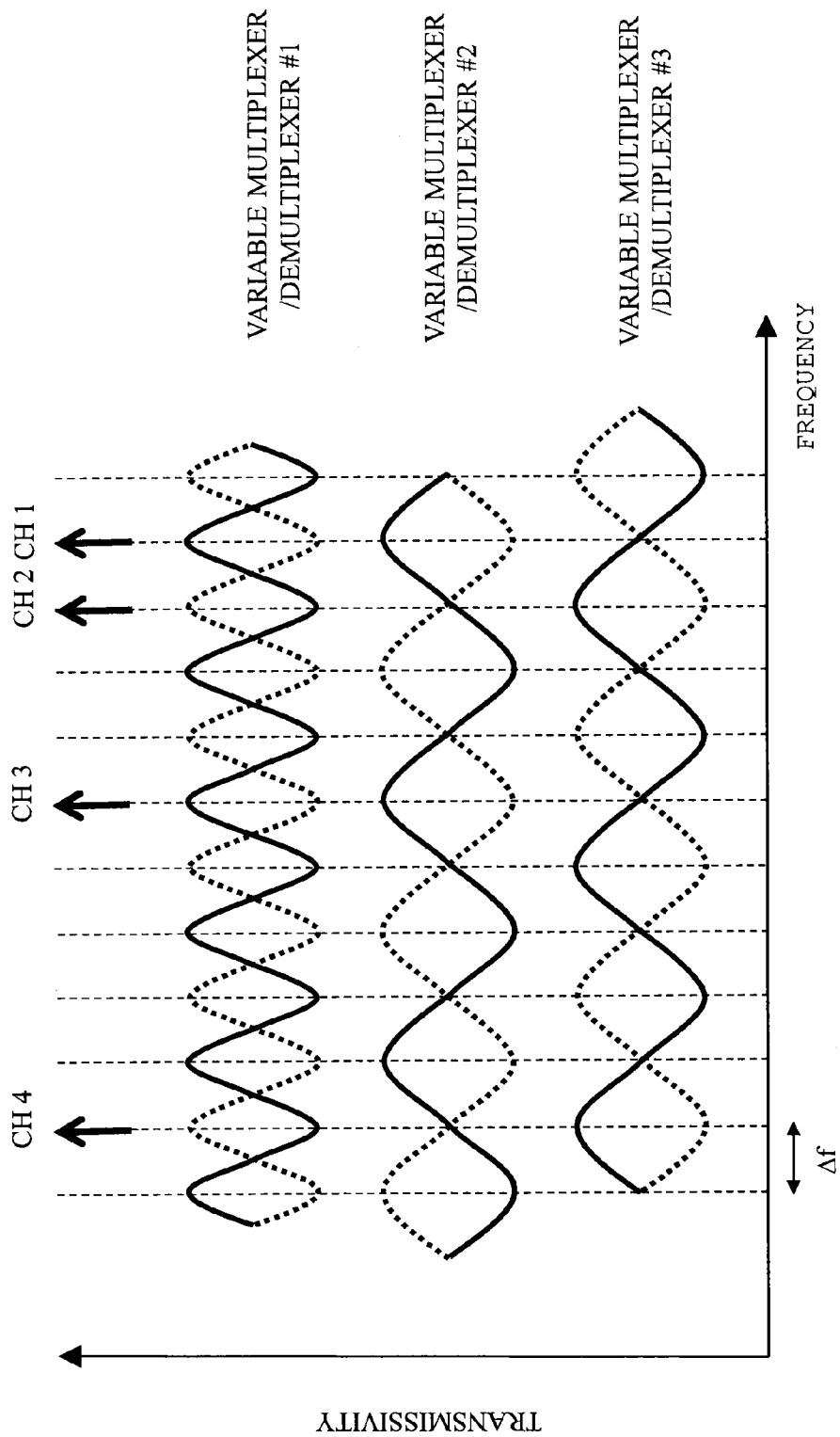
FIG. 14 is a view showing a setting example of the variable multiplexer/demultiplexer of the transmission portion of the multi-flow optical transceiver according to the present disclosure.

Next, there will be considered a case where the BPSK signal×two sub-carrier OFDM signal+BPSK signal×two carrier WDM signal is generated, as shown in FIG. 7($d$). For example, the variable multiplexer/demultiplexer 23 on the input side of the optical modulator 30 is set as shown in FIG. 14. At this time, all the variable multiplexers/demultiplexers 23 on the input side of the optical modulator 30 are set in a binary manner so that 100% of input light is coupled to either one of the output ports. In this case, in the constitutional example shown in FIG. 5, for example, only the wavelength-tunable light sources (10-1, 10-2, and 10-4) are used as light sources, and since the wavelength-tunable light source 10-3 is not used, it is quenched. In this constitution, any one of the wavelength-tunable light source 10-2 and the wavelength-tunable light source 10-3 connected to the multiple carrier generating portion 50 is required to be surely used as a light source. In the multiple carrier generating portion 50-1, two optical carriers (ch1 and ch2 of FIG. 14) whose frequency intervals are Δf and optical phases are synchronized with each other are generated. The two optical carriers are separated into a single-wavelength optical carrier by the variable multiplexer/demultiplexer 23-1 of previous stage and, the two optical carriers of ch1 and ch2 are input to the variable multiplexers/demultiplexers (23-2 and 23-3) of post stage. The optical carrier of ch1 and the optical carrier of ch3 from the wavelength-tunable light source 10-1 shown in FIG. 5 are input to the variable multiplexer/demultiplexer 23-2. The optical carrier of ch1 and the optical carrier ch3 are coupled to the optical modulator 30-1 and the optical modulator 30-2, respectively. Similarly, the optical carrier of ch2 and the optical carrier of ch4 from the wavelength-tunable light source 10-4 shown in FIG. 5 are input to the variable multiplexer/demultiplexer 23-3. The optical carrier of ch2 and the optical carrier of ch4 are coupled to the optical modulator 30-3 and the optical modulator 30-4, respectively. The operation of optical modulation and recombination are similar to that in the case where different BPSK signals are generated by the four optical carriers. In this constitution, since the variable multiplexer/demultiplexer 23 has the wavelength selectivity, the wavelength interval that can be set by each of the wavelength-tunable light sources 10 is limited to discrete values. However, since the wavelength selectivity of the variable multiplexer/demultiplexer 23 is periodic, a configurable wavelength region can cover a wide wavelength variable region of the wavelength-tunable light source 10.

Figure 16:
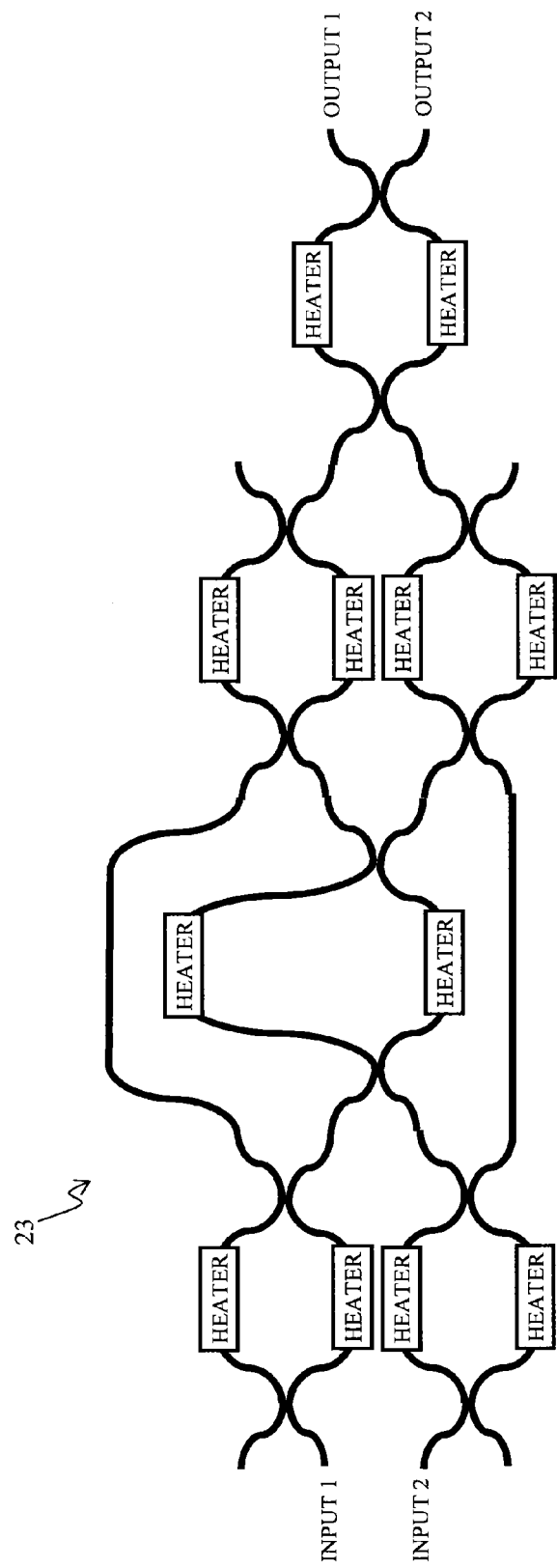
FIG. 16 is a view showing an alternative constitutional example of the variable multiplexer/demultiplexer of the transmission portion of the multi-flow optical transceiver according to the present disclosure.

In the above description, in the variable multiplexer/demultiplexer 23 on the input side of the optical modulator 30, since the asymmetric MZI optical switch having the wavelength selectivity shown in FIG. 6($a$)-FIG. 6($b$) has been considered in the constitutional example shown in FIG. 5, the wavelength interval that can be set by each of the wavelength-tunable light sources 10 is limited to discrete values. Meanwhile, when such an optical switch which can switch the presence or absence of the wavelength selectivity is employed in the variable multiplexer/demultiplexer 23 on the input side of the optical modulator 30, the wavelength interval that can be set by each of the wavelength-tunable light sources 10 can be set more freely. FIG. 16 shows a constitutional example of the variable multiplexer/demultiplexer 23 realizing that. In this constitutional example, a plurality of the symmetric MZI optical switches are arranged at input and output ends, and asymmetric MZI optical switches are arranged between the symmetric MZI optical switches. When optical distribution with no wavelength selectivity is desired to be performed, the symmetric MZI optical switches arranged at input and output ends are set to avoid the central asymmetric MZI optical switches. When optical distribution with the wavelength selectivity is desired to be performed, the symmetric MZI optical switches arranged at input and output ends are set to pass the central asymmetric MZI optical switches. The variable multiplexer/demultiplexer 23 of FIG. 16 is FSR=2Δf.

In this embodiment, although the constitution in which the multiple carriers are generated using the light of the wavelength-tunable light sources (10-2 and 10-3) has been described, this disclosure is not limited to the constitution. For example, the multiple carriers may be generated using the light of all the wavelength-tunable light sources (10-1 to 10-4), and the multiple carriers may be generated using the light of the single wavelength-tunable light source (for example, 10-2). Moreover, the multiple carriers generated in a single multiple carrier generating portion may be branched in the wavelength separation portion and coupled to the input ports (21-1 to 21-4) of the optical multiplexing/demultiplexing switch 20.

Figure 15:
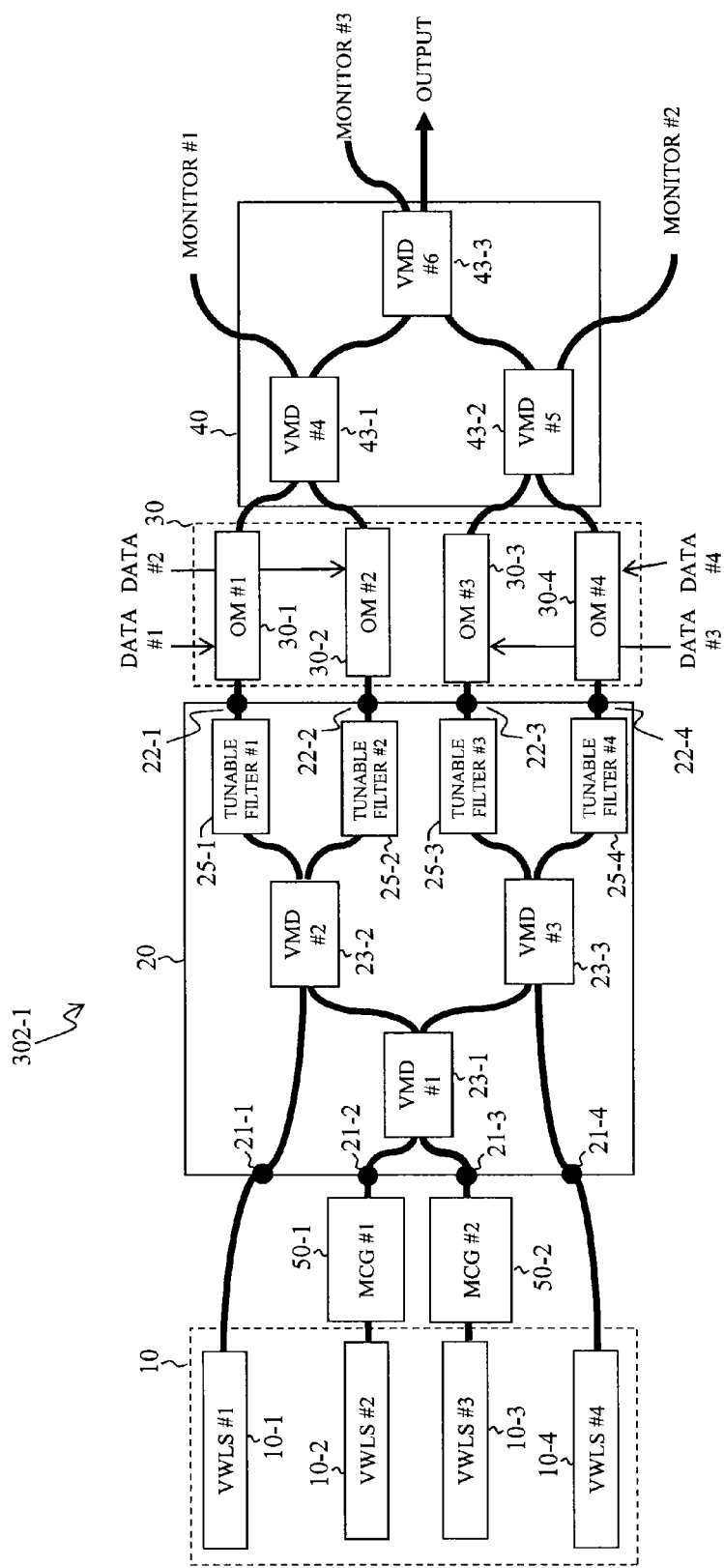
FIG. 15 is a view showing a transmission portion of the multi-flow optical transceiver according to the present disclosure.

FIG. 15 is a view for explaining an optical transmission portion 302-1 of the multi-flow optical transceiver of this embodiment. The optical transmission portion 302-1 of the multi-flow optical transceiver corresponds to the optical transmission portion 302 of the multi-flow optical transceiver of FIG. 5 with which, at the input ends of the optical modulators (30-1 to 30-4), tunable filters (25-1 to 25-4) through which one wavelength can be selectively transmitted from the multiple carriers are further provided. Although the transmission portion 302 of the multi-flow optical transceiver of FIG. 5 applies the wavelength separation of the multiple carriers by using the optical switch having the wavelength selectivity shown in FIG. 6($a$)-FIG. 6($b$) in the variable multiplexers/demultiplexers #1 to #3, for example, if FSR of the variable multiplexers/demultiplexers (23-1 to 23-3) cannot be freely changed, the frequency arrangement of the optical signal to be generated receives certain restrictions.

In FIG. 15, although the tunable filter is inserted in the post stage of the variable multiplexers/demultiplexers 23-2 and 23-3, the tunable filter may be inserted in the previous stage of the variable multiplexers/demultiplexers 23-2 and 23-3 or the post-stage or previous stage of the variable multiplexer/demultiplexer 23-1. In this case, if the tunable filter associated with the outputs of the wavelength-tunable light sources 10-1 and 10-2 is removed, there is an effect of reducing the cost.

In the transmission portion 302-1 of the multi-flow optical transceiver of FIG. 15, the variable multiplexers/demultiplexers (23-1 to 23-3) are optical switches with no wavelength selectivity shown in FIG. 3, for example, whereby the restriction of the frequency arrangement of the generated optical signal can be eliminated. As one example, there will be considered a case where four waves of the multiple carriers are generated in the wavelength-tunable light source 10-2 and the multiple carrier generating portion 50-1. At this time, the variable multiplexers/demultiplexers (23-1 to 23-3) are set to distribute an input signal at a power ratio of 1:1, as shown in FIG. 4(*c*), whereby the four waves of the multiple carriers are distributed to the tunable filters (25-1 to 25-4) with equal optical power. The optical carriers having different wavelengths are selected from the four waves of the multiple carriers in the tunable filters (25-1 to 25-4), whereby the frequency separation of the multiple carriers can be realized.

As another example, there will be considered a case where two waves of the multiple carriers are generated in the wavelength-tunable light source 10-2 and the multiple carrier generating portion 50-1, and two waves of the multiple carriers are generated in the wavelength-tunable light source 10-3 and the multiple carrier generating portion 50-2. At this time, the variable multiplexer/demultiplexer 23-1 is set so that 100% of an input is coupled to either one of outputs, as shown in FIG. 4(*b*), and the variable multiplexers/demultiplexers 23-1 and 23-2 are set so that the input signal is distributed at an optical power ratio of 1:1, as shown in FIG. 4(*c*), whereby the two multiple carriers generated in the wavelength-tunable light source 10-2 and the multiple carrier generating portion 50-1 are distributed to the tunable filters (25-1 and 25-2) with equal optical power, and the two multiple carriers generated in the wavelength-tunable light source 10-3 and the multiple carrier generating portion 50-2 are distributed to the tunable filters (25-3 and 25-4) with equal optical power. One wave of the two multiple carriers is selected by the tunable filter 25-1, and the remaining one wave is selected by the tunable filter 25-2. Moreover, similar frequency separation is performed in the tunable filters 25-3 and 25-4. Thus, it is possible to realize the frequency separation of four multiple carries generated in the two wavelength-tunable light sources and the two multiple carrier generating portions. Accordingly, by virtue of the provision of the tunable filter as the wavelength selection unit, even when multiple carrier generation is used, the restriction of configurable optical frequency is eliminated, and an optical signal can be disposed in any optical frequency band.

Third Embodiment

Figure 17:
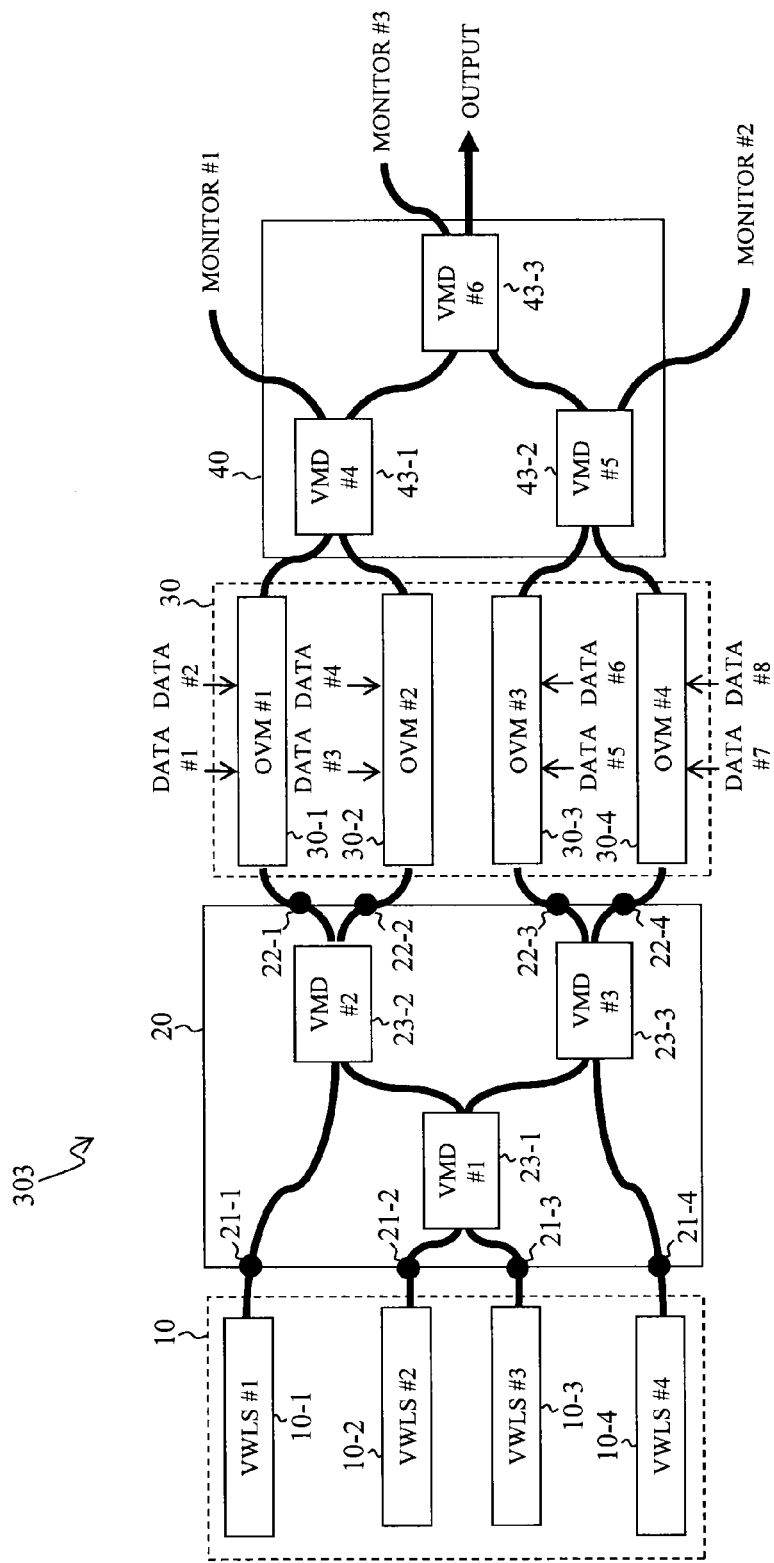
FIG. 17 is a view showing a transmission portion of the multi-flow optical transceiver according to the present disclosure.
Figure 18:
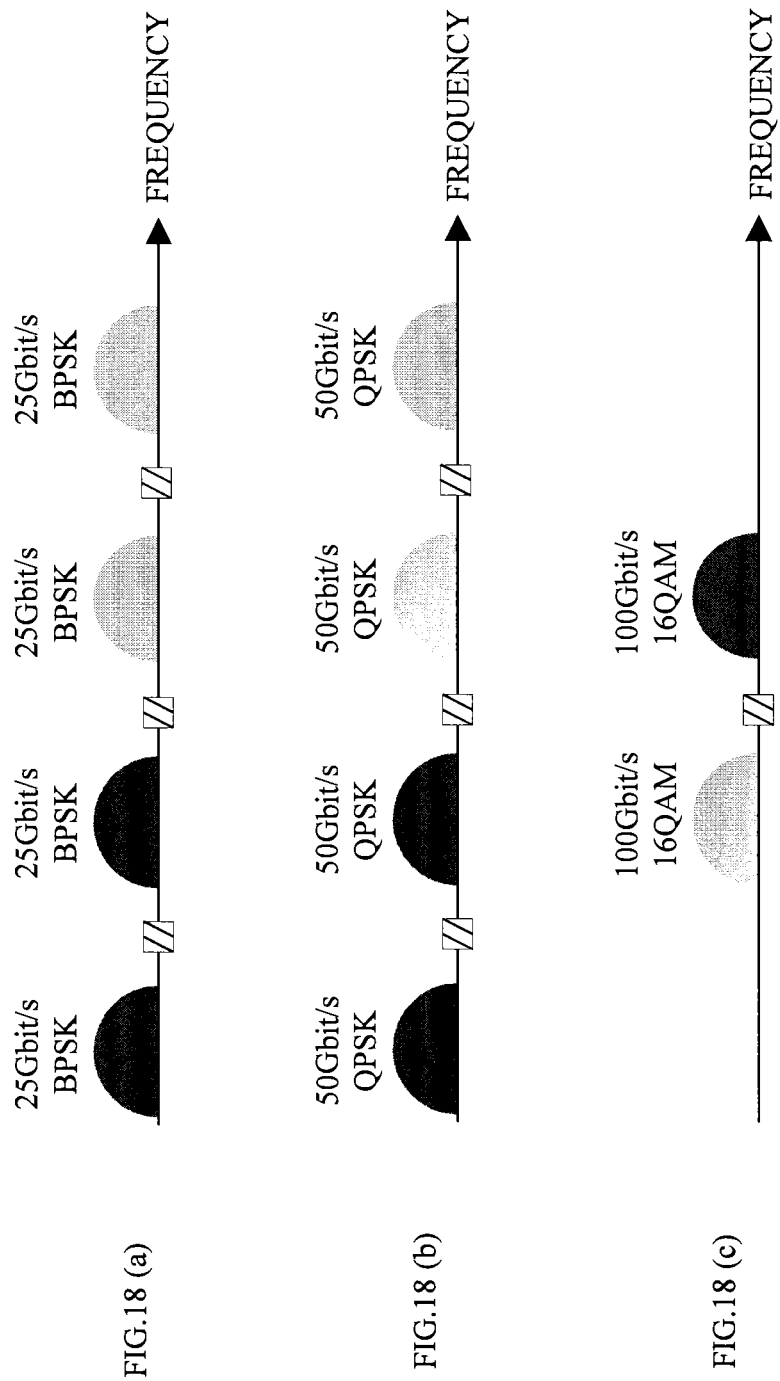
FIG. 18(a), FIG. 18(b) and FIG. 18(c) are views showing an optical signal spectrum example according to the transmission portion of the multi-flow optical transceiver according to the present disclosure.

FIG. 17 shows a constitutional example of an optical transmission portion 303 of the multi-flow optical transceiver of this embodiment. This constitutional example is an optical transmission portion 301 of the multi-flow optical transceiver of FIG. 1 in which the optical modulator 30 is replaced with an optical vector modulator 30'. In this constitutional example, as shown in FIG. 18(*a*)-FIG. 18(*c*), it is possible to selectively generate signals of FIG. 18(*a*) a BPSK signal×four carrier WDM, FIG. 18(*b*) a QPSK signal×four carrier WDM, and FIG. 18(*c*) a 16 QAM signal×two carrier WDM, for example. Although each signal generating method is similar to the description of the optical transmission portion 301 of the multi-flow optical transceiver of FIG. 1, when the BPSK signal is generated, only one of two modulation ports of the optical vector modulator 30' is used, and a bias voltage is applied to the modulation port which is not used so that light is blocked in use.

Fourth Embodiment

Figure 19:
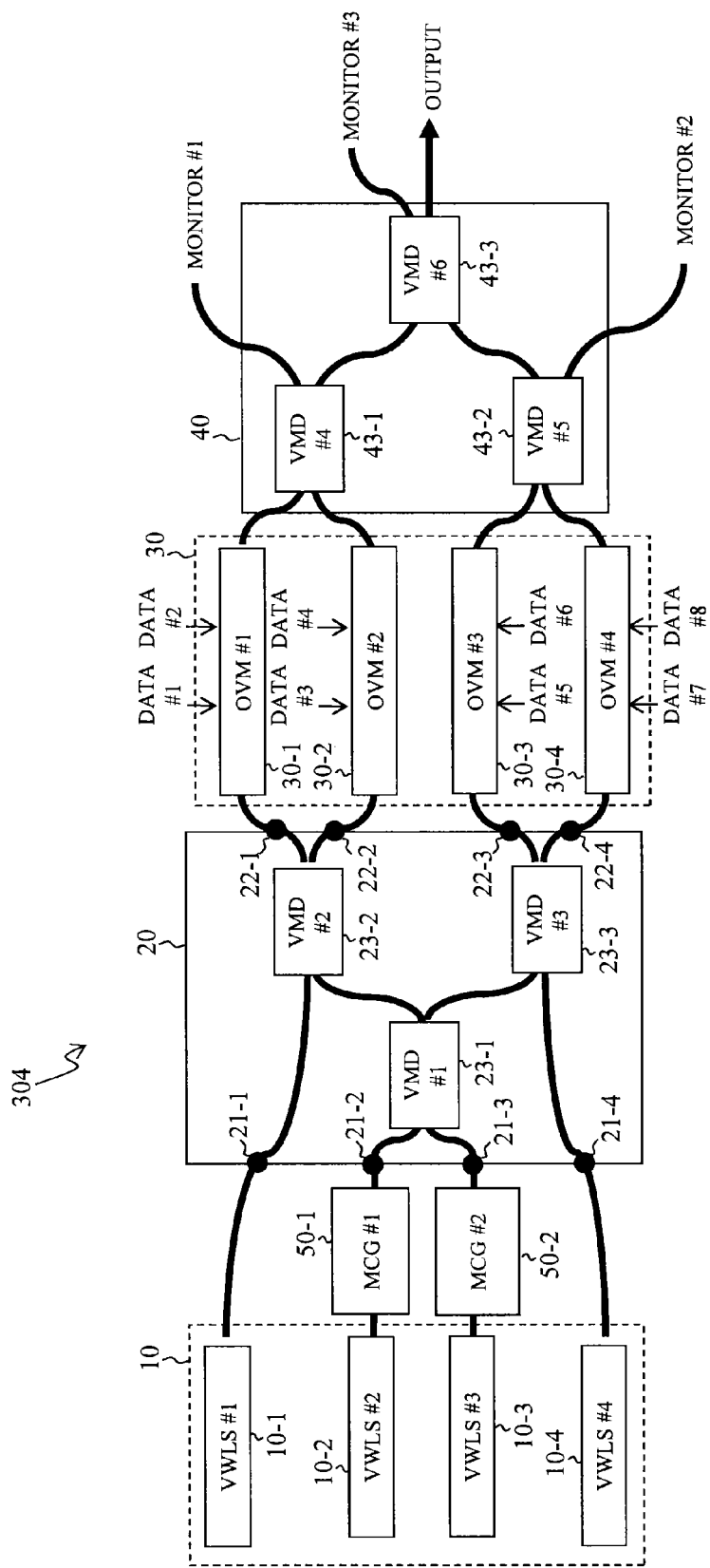
FIG. 19 is a view showing a transmission portion of the multi-flow optical transceiver according to the present disclosure.
Figure 20:
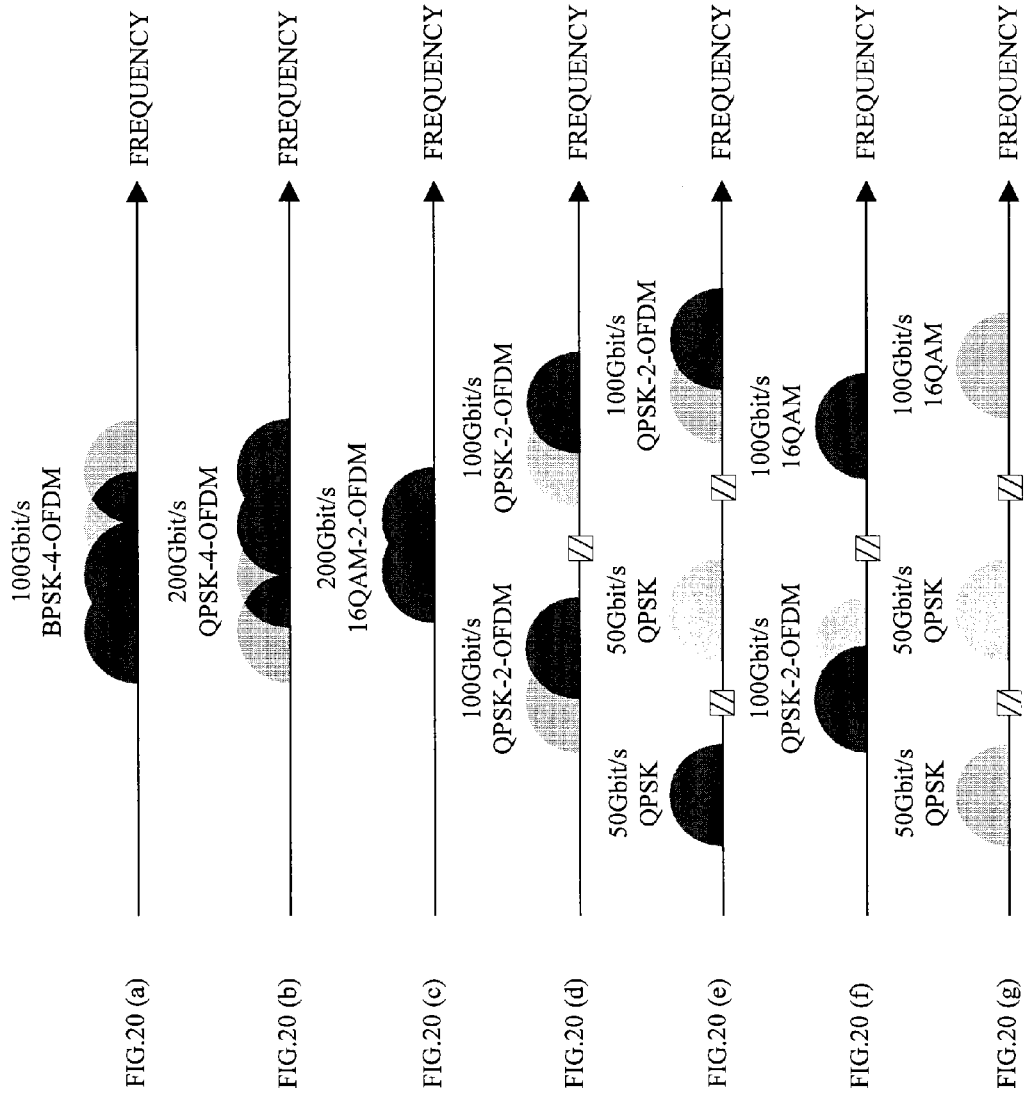
FIG. 20(a), FIG. 20(b), FIG. 20(c), FIG. 20(d), FIG. 20(e), FIG. 20(f) and FIG. 20(g) are views showing an optical signal spectrum example according to the transmission portion of the multi-flow optical transceiver according to the present disclosure.

FIG. 19 is a view showing a constitutional example of an optical transmission portion 304 of the multi-flow optical transceiver of this embodiment. In this constitutional example, the optical modulator 30 of the optical transmission portion 302 of the multi-flow optical transceiver of FIG. 5 is replaced with an optical vector modulator 30'. In this constitutional example, as shown in FIG. 20(*a*)-FIG. 20(*g*), it is possible to selectively generate FIG. 20(*a*) a BPSK signal×four sub-carrier OFDM (four carrier WDM is also possible), FIG. 20(*b*) a QPSK signal×four sub-carrier OFDM (four carrier WDM is also possible), FIG. 20(*c*) a 16 QAM signal×two sub-carrier OFDM (two carrier WDM is also possible), FIG. 20(*d*) a QPSK signal×two sub-carrier OFDM×two carrier WDM, FIG. 20(*e*) a QPSK signal×two sub-carrier OFDM+QPSK signal×two carrier WDM, FIG. 20(*f*) a 16 QAM signal+QPSK signal×two sub-carrier OFDM, and FIG. 20(*g*) a 16 QAM signal+QPSK signal×two carrier WDM, for example. Although each signal generating method is similar to the description of the optical transmission portion 302 of the multi-flow optical transceiver of FIG. 5, when the BPSK signal is generated, only one of two modulation ports of the optical vector modulator 30' is used, and a bias voltage is applied to the modulation port which is not used so that light is blocked in use.

Fifth Embodiment

Figure 21:
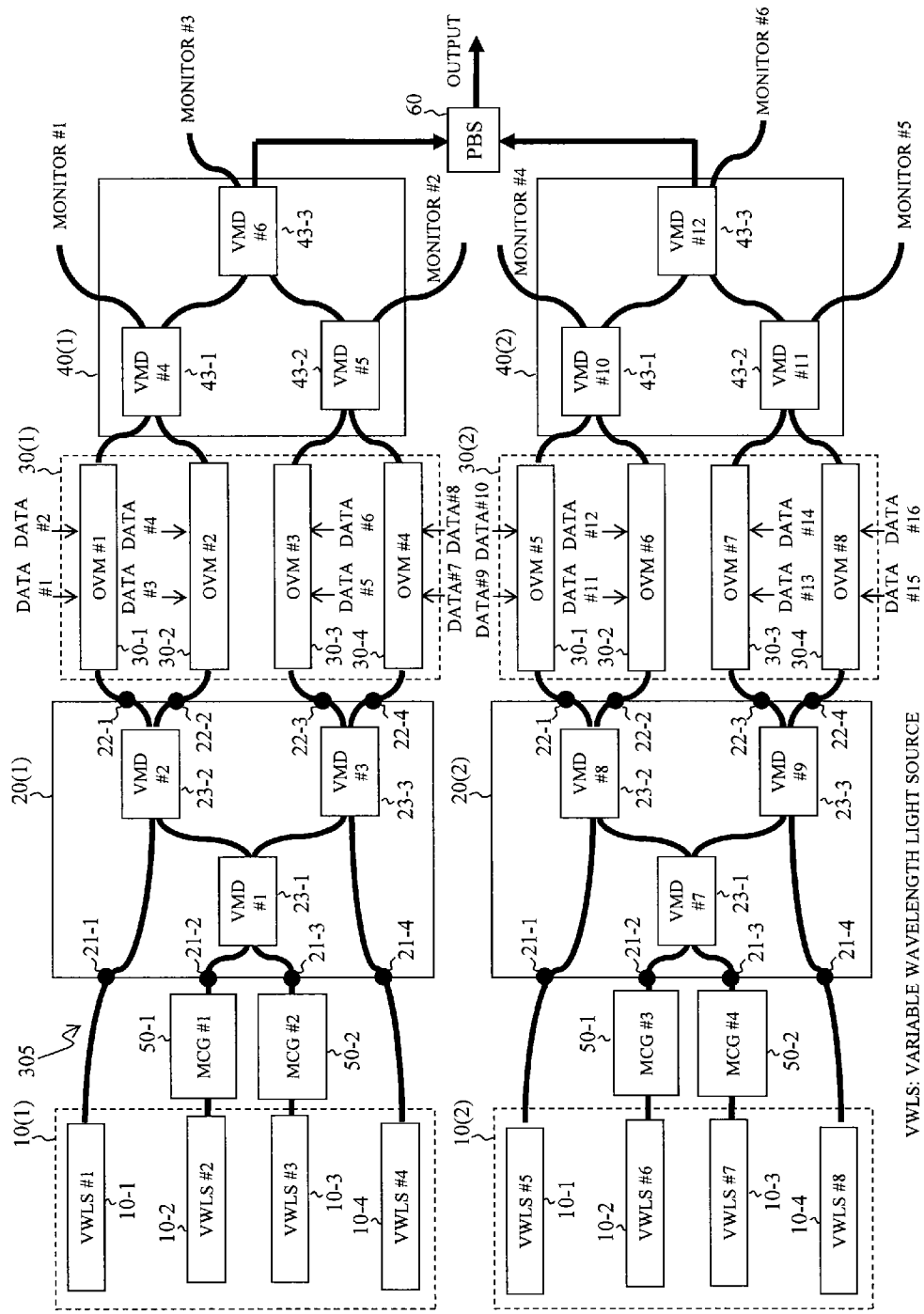
FIG. 21 is a view showing a transmission portion of the multi-flow optical transceiver according to the present disclosure.
Figure 22:
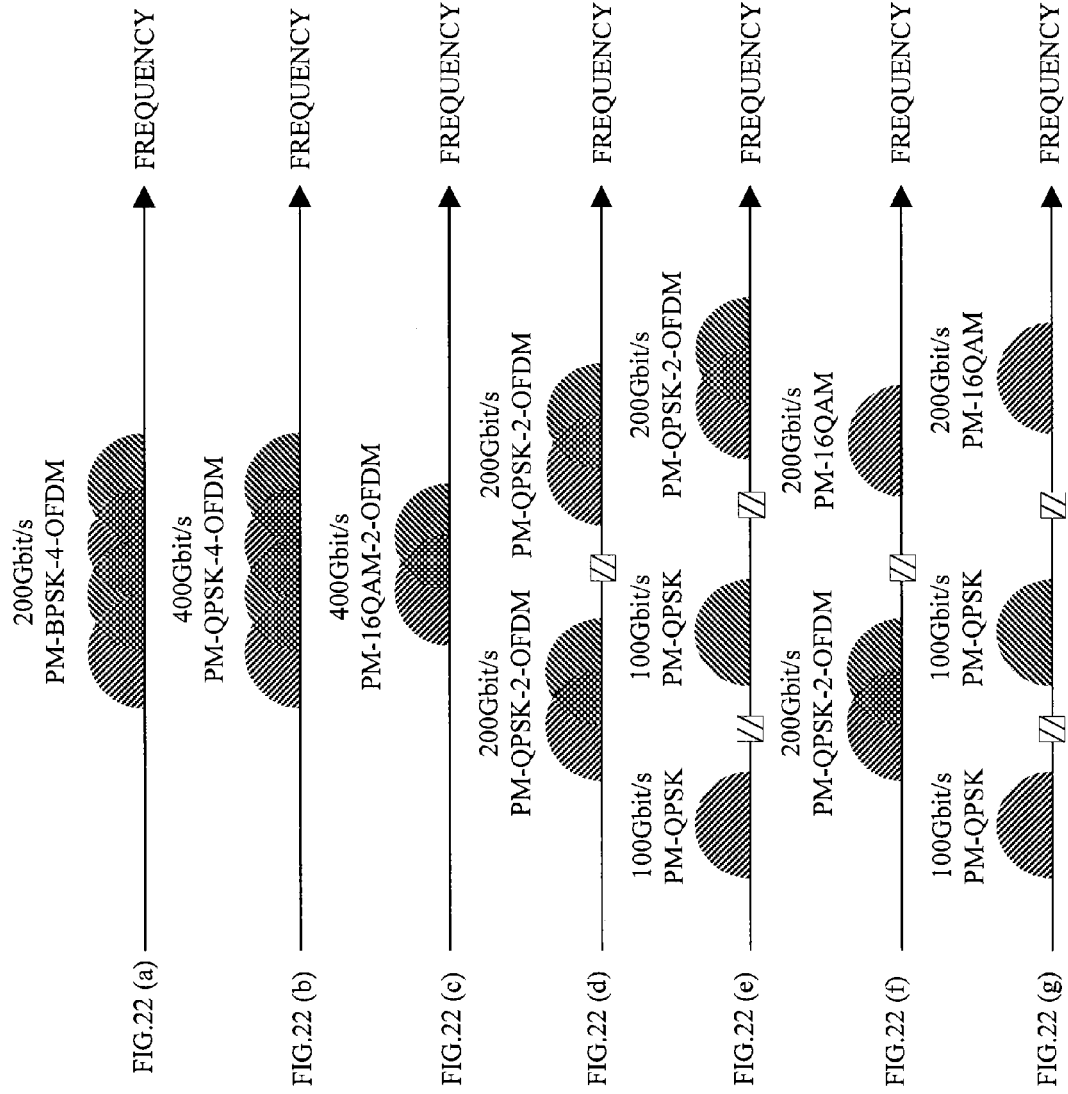
FIG. 22(a), FIG. 22(b), FIG. 22(c), FIG. 22(d), FIG. 22(e), FIG. 22(f) and FIG. 22(g) are views showing an optical signal spectrum example according to the transmission portion of the multi-flow optical transceiver according to the present disclosure.

FIG. 21 is a view showing a constitutional example of an optical transmission portion 305 of the multi-flow optical transceiver of this embodiment. In this constitutional example, the two optical transmission portions 304 of the multi-flow optical transceiver of FIG. 19 are provided, and the outputs of the optical transmission portions 304 are coupled with orthogonal polarization by using a polarization beam combiner (PBC) 60, so that a polarization multiplexed signal can be generated. In this constitutional example, as shown in FIG. 22(*a*)-FIG. 22(*g*), it is possible to selectively generate FIG. 22(*a*) a polarization multiple (PM)-BPSK signal×four sub-carrier OFDM (four carrier WDM is also possible), FIG. 22(*b*) a PM-QPSK signal×four sub-carrier OFDM (four carrier WDM is also possible), FIG. 22(*c*) a PM-16 QAM signal×two sub-carrier OFDM (two carrier WDM is also possible), FIG. 22(*d*) a PM-QPSK signal×two sub-carrier OFDM×two carrier WDM, FIG. 22(*e*) a PM-QPSK signal×two sub-carrier OFDM+PM-QPSK signal×2 carrier WDM, FIG. 22(*f*) a PM-16 QAM signal+PM-QPSK signal×two sub-carrier OFDM, and FIG. 22(*g*) a PM-16 QAM signal+PM-QPSK signal×two carrier WDM, for example. Although each signal generating method is similar to the description of the optical transmission portion 304 of the multi-flow optical transceiver of FIG. 19, since the polarization multiplied signal can be generated, a doubled optical signal can be generated at a total bit rate.

Sixth Embodiment

Figure 23:
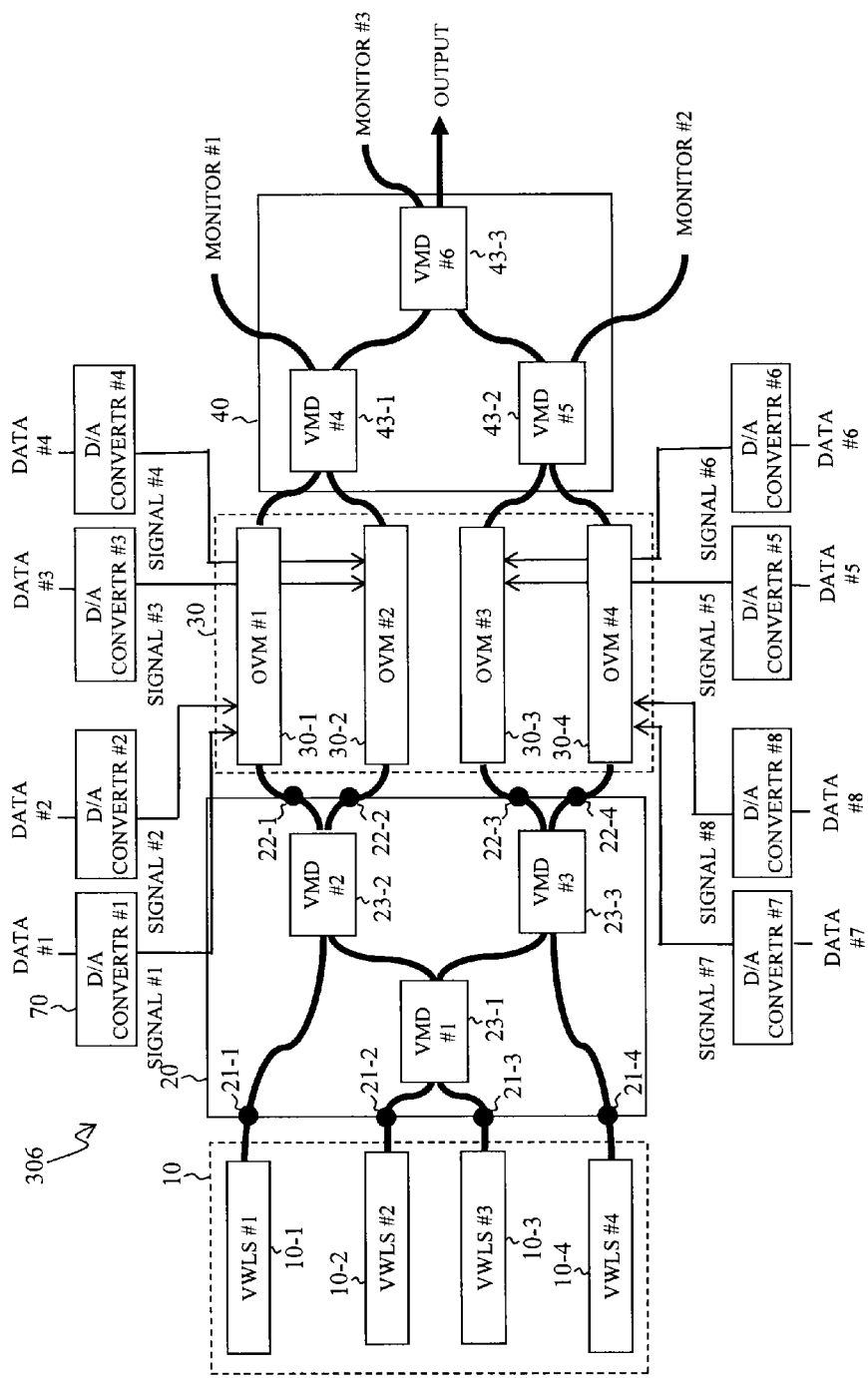
FIG. 23 is a view showing a transmission portion of the multi-flow optical transceiver according to the present disclosure.

FIG. 23 is a view for explaining an optical transmission portion 306 of the multi-flow optical transceiver of this embodiment. The optical transmission portion 306 of the multi-flow optical transceiver corresponds to the optical transmission portion 303 of the multi-flow optical transceiver of FIG. 17 which is further provided with digital/analog conversion unit 70 which applies digital/analog conversion to an input signal and inputs the converted signal to optical modulation unit 30'.

Figure 24:
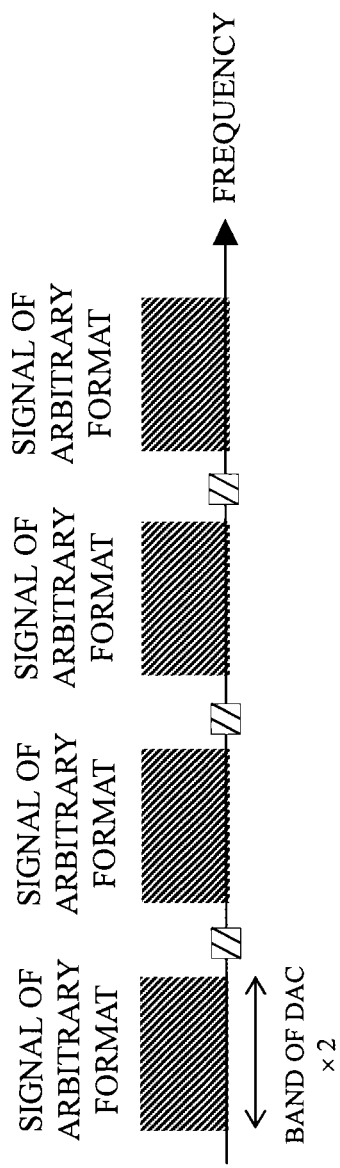
FIG. 24 is a view showing an optical signal spectrum example according to the transmission portion of the multi-flow optical transceiver according to the present disclosure. This example is a spectrum example of an arbitrary format signal×4 carrier WDM signal.

FIG. 23 is a view showing a constitutional example of the optical transmission portion 306 of the multi-flow optical transceiver of this embodiment. The optical transmission portion 306 corresponds to the optical transmission portion 303 of the multi-flow optical transceiver of FIG. 17 in which the digital/analog (A/D) conversion converter 70 is added, the A/D converter 70 generating a signal driving the optical vector modulator 30'. As shown in FIG. 24, any modulated signal×four carrier signal having a bandwidth twice the bandwidth of the A/D converter 70 can be generated. Any modulated signal means a signal in any form that can be synthesized in a signal electrical region, such as an OFDM signal, a single-side band (SSB), and a signal having a spectrum close to a rectangular shape of Nyquist limitation.

Seventh Embodiment

Figure 25:
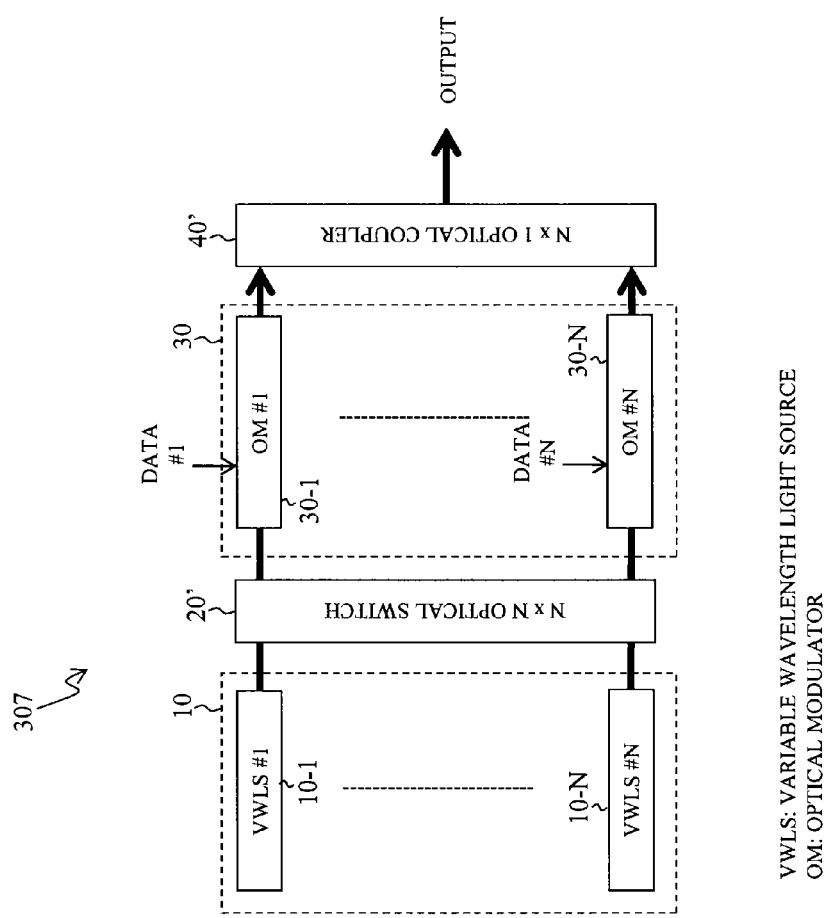
FIG. 25 is a view showing a transmission portion of the multi-flow optical transceiver according to the present disclosure.

FIG. 25 is a view showing a constitutional example of an optical transmission portion 307 of the multi-flow optical transceiver of this embodiment. This constitutional example is constituted of N wavelength-tunable light sources 10, an N×N optical switch 20' as an optical multiplexing/demultiplexing switch 20, N optical modulators 30, and an N×1 optical coupler 40' as the optical coupling unit 40. The N×N optical switch 20' has a function of distributing/coupling a plurality of input lights with any power ratio. In this constitutional example, diversified optical signals including a BPSK signal×N carrier, a QPSK signal×N/2 carrier, a 16 QAM signal×N/4 carrier, and combination thereof can be selectively generated. Except for the N×N optical switch 20', the mechanism of signal generation is similar to that in the optical transmission portion 301 of the multi-flow optical transceiver of FIG. 1. The constitutional example and operation of the N×N optical switch 20' will be hereinafter described.

Figure 26:
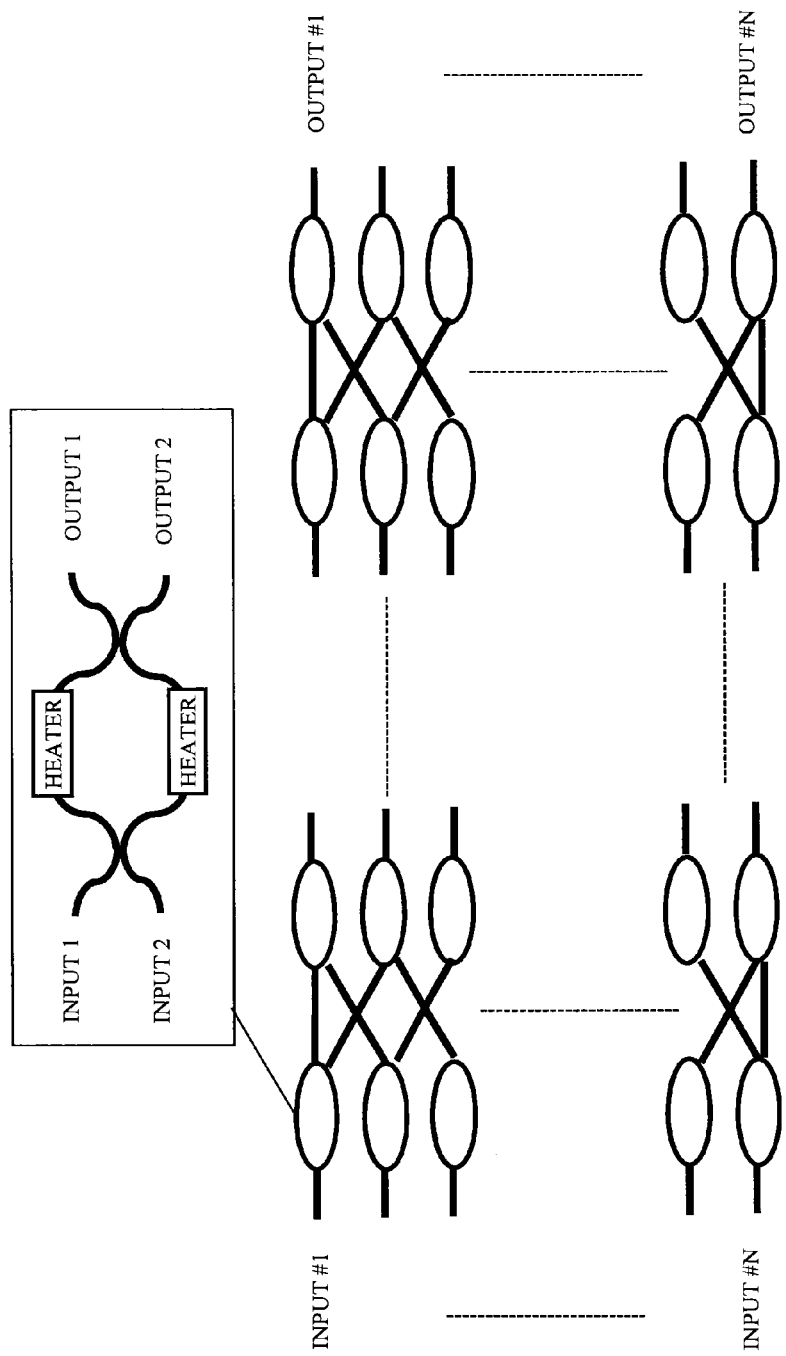
FIG. 26 is a view showing a constitutional example of an N×N optical switch of the transmission portion of the multi-flow optical transceiver according to the present disclosure.

FIG. 26 is a view showing the constitutional example of the N×N optical switch 20'. This constitutional example has a matrix switch configuration based on a symmetric MZI optical switch using PLC and does not have frequency selection characteristics in principle. The temperature of an optical waveguide is changed by a heater disposed on the optical waveguide of each MZI, whereby an optical length of the optical waveguide is changed by a thermooptic effect, and the distribution ratio and the coupling ratio can be continuously changed. Not only 100% of an input can be coupled from N input ports to N output ports in any combination, but light in any input port in any combination can be output to any output with any power coupling ratio by adjusting a branch ratio of the optical power according to each MZI in an analog manner. Accordingly, light is branched at a power ratio of 1:1 by using two optical modulators, and the branched lights are recoupled at a power ratio of 1:1 after modulation, whereby the QPSK signal can be synthesized. Moreover, light is branched at a power ratio of 1:2 by using four optical modulators, and the branched lights are recoupled at a power ratio of 1:1 after modulation, whereby the 16 QAM signal can be synthesized. Although not clearly shown in FIG. 26, there is provided a function of adjusting the phase differences of lights from different waveguides before multiplexing the lights. It is preferable that a similar function is provided in other examples of the present disclosure.

Eighth Embodiment

Figure 27:
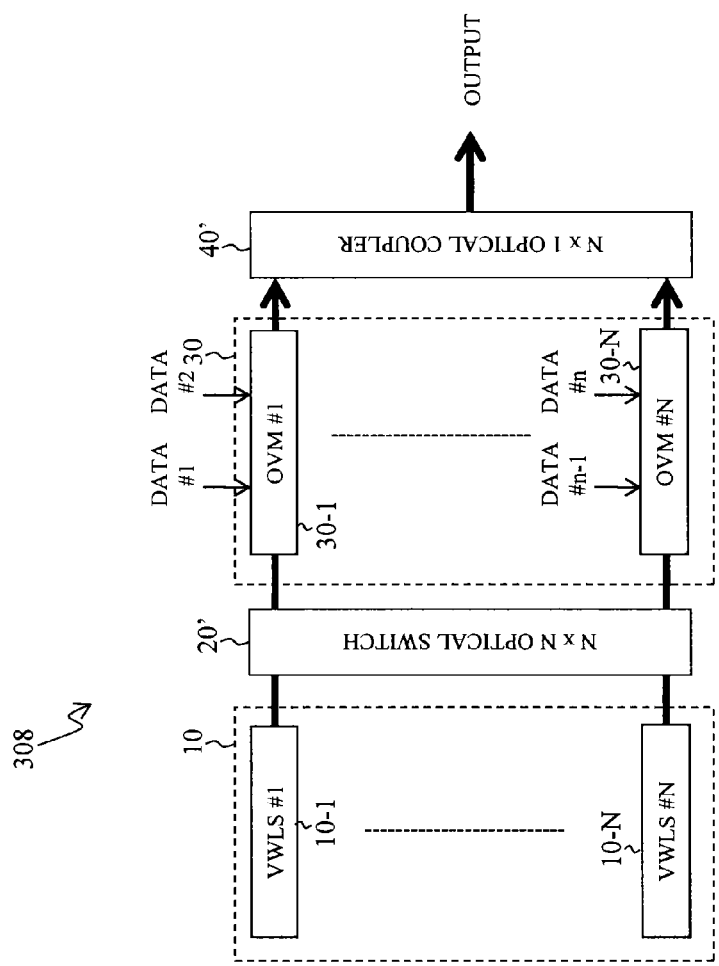
FIG. 27 is a view showing a transmission portion of the multi-flow optical transceiver according to the present disclosure.

FIG. 27 is a view showing the constitutional example according to an optical transmission portion 308 of a multi-flow optical transceiver of this embodiment. In this constitutional example, the optical modulator in the seventh constitutional example shown in FIG. 25 is replaced with an optical vector modulator 30'. In this constitutional example, as in the optical transmission portion 307 of the multi-flow optical transceiver shown in FIG. 25, diversified optical signals including a BPSK signal or QPSK signal×N carrier, and a 16 QAM signal×N/2 carrier, and combination thereof can be selectively generated. Although each signal generating method is similar to the description of the optical transmission portion 307 of the multi-flow optical transceiver of FIG. 25, when the BPSK signal is generated, only one of two modulation ports of the optical vector modulator 30' is used, and a bias voltage is applied to the modulation port which is not used so that light is blocked in use.

Ninth Embodiment

Figure 28:
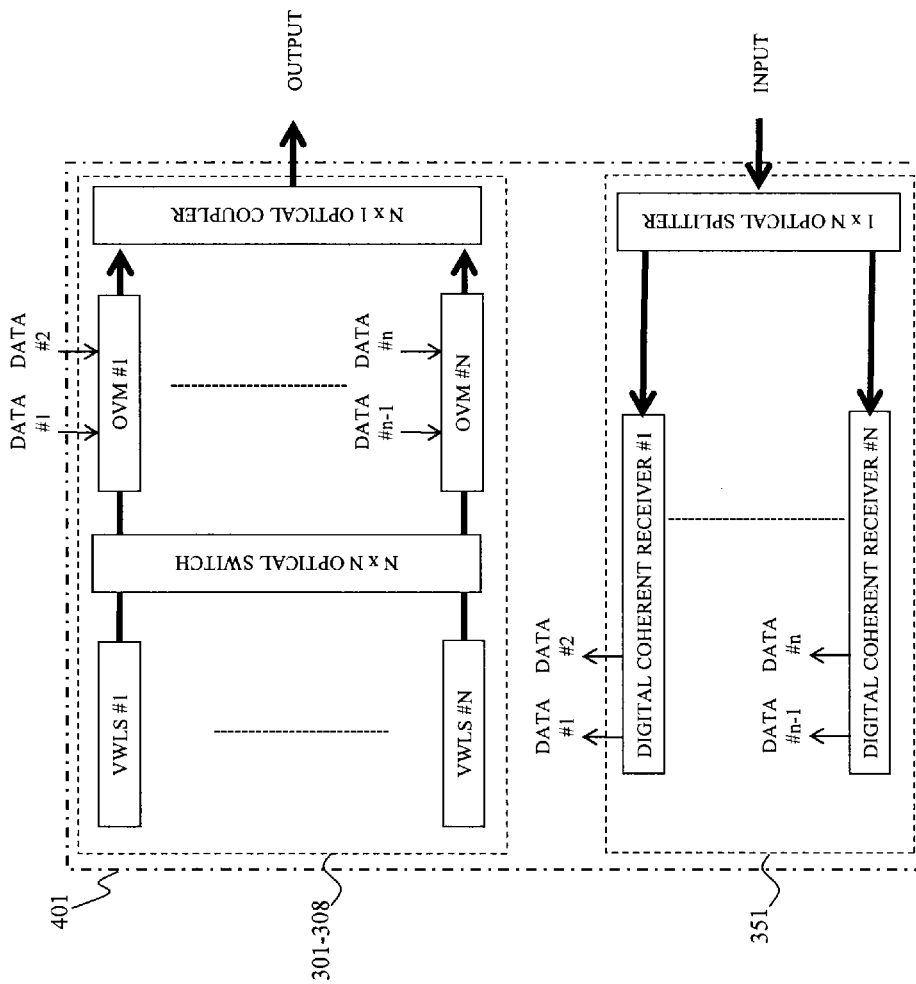
FIG. 28 is a view showing the multi-flow optical transceiver according to the present disclosure.

FIG. 28 is a view showing the constitutional example of a multi-flow optical transceiver 401 of this embodiment. An optical transmission portion of the multi-flow optical transceiver 401 is each of the optical transmission portions (301 to 308) of the first to eighth embodiments. An optical reception portion 351 is a bandwidth division digital coherent receiver using a plurality of local light sources. Receivers having other constitution such as a direct detection receiver using an MZI optical demodulation circuit may be used as long as it can a plurality of branch wavebands and receive the branched wavebands.

Tenth Embodiment

Figure 29:
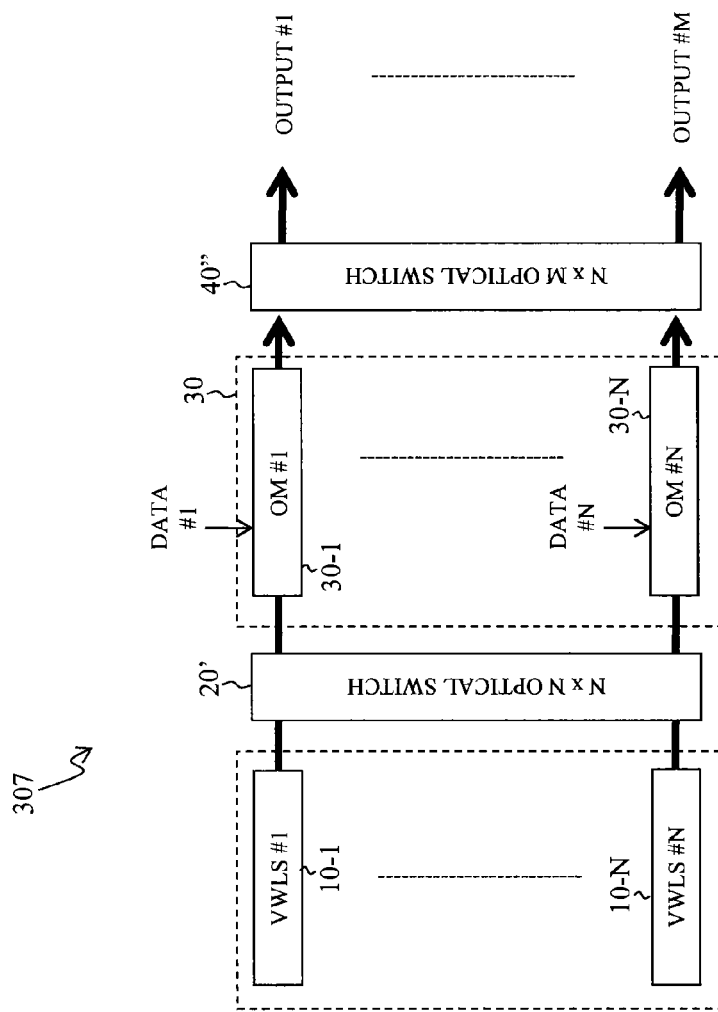
FIG. 29 is a view showing a transmission portion of the multi-flow optical transceiver according to the present disclosure.

FIG. 29 is a view for explaining an optical transmission portion 310 of a multi-flow optical transceiver of this embodiment. The optical transmission portion 310 of the multi-flow optical transceiver is characterized in that the optical coupling unit 40 is a switch 40" with an optical distribution function having a plurality of optical output ports.

FIG. 29 is a view showing a constitutional example of the optical transmission portion 310 of the multi-flow optical transceiver of the present disclosure. In this constitutional example, the N×1 optical coupler 40' of the optical transmission portion 308 of the multi-flow optical transceiver of FIG. 25 is replaced with the N×N optical switch 40". Although a kind of an optical signal which can be generated is not different from the optical transmission portion 308 of the multi-flow optical transceiver, not only signals can be effectively sorted into M paths (M≤N), but a plurality of signals having the same wavelength can be generated and sent in different paths.

Eleventh Embodiment

Multi-flow optical transponders (501 and 502) of this embodiment are provided with at least one client interface 71, reconfigurable digital signal processing unit 72 connected to the client interface 71, an m:n (m>n) parallel-serial/serial-parallel conversion unit 73 connected to the digital signal processing unit 72, and a multi-flow optical transceiver 401 connected to the parallel-serial/serial-parallel conversion unit 73.

Figure 30:
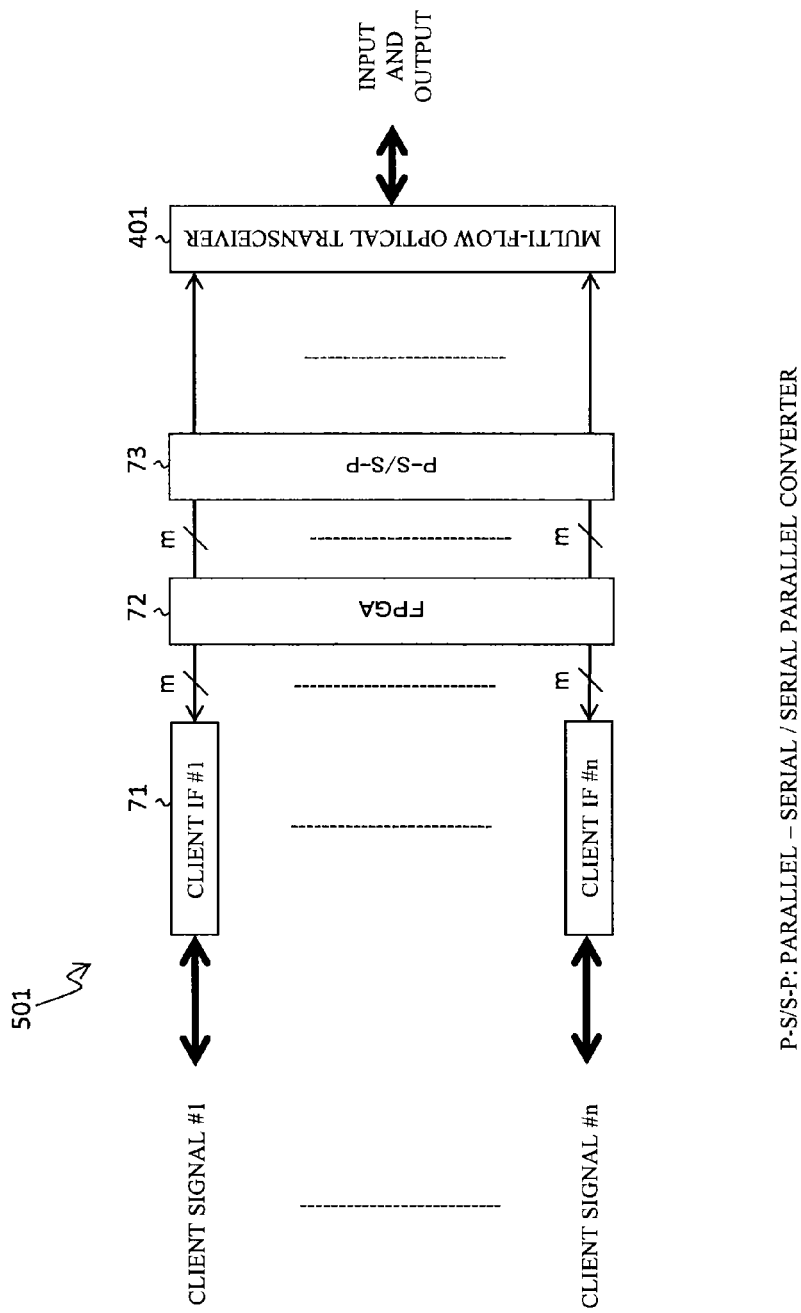
FIG. 30 is a view showing a multi-flow optical transponder according to the present disclosure.
Figure 31:
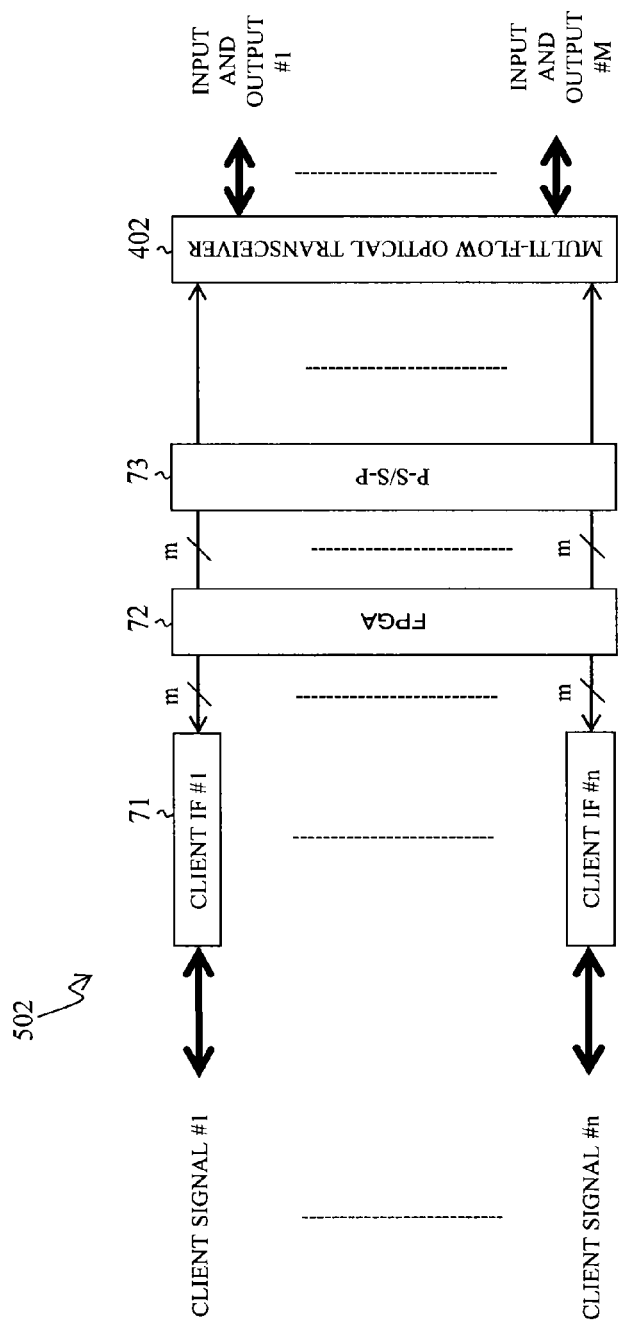
FIG. 31 is a view showing the multi-flow optical transponder according to the present disclosure.

Each of FIGS. 30 and 31 is a view showing a constitutional example of the multi-flow optical transponders (501 and 502) of this embodiment. FIG. 30 shows the multi-flow optical transponder 501 having a pair of input and output ports. FIG. 31 shows the multi-flow optical transponder 502 having M pairs of input and output ports. The multi-flow optical transponder 501 is constituted of the multi-flow optical transceiver 401 described in FIG. 28, the n client interfaces 71, the reconfigurable digital signal processing circuit 72, and the m:n (m>n) parallel-serial/serial-parallel conversion circuit 73. The multi-flow optical transponder 502 is constituted of the multi-flow optical transceiver 402 including the optical transmission portion 310 described in FIG. 29, the n client interfaces 71, the reconfigurable digital signal processing circuit 72, and the m:n (m>n) parallel-serial/serial-parallel conversion circuit 73.

The reconfigurable digital signal processing circuit 72 may be constituted of a field programmable gate array (FPGA) circuit, for example. FIG. 32(a)-FIG. 32(d) show a constitutional example thereof. The digital signal processing circuit 72 can be used by selectively switching a framer circuit from among FIG. 32 (a) a framer circuit constituting one 400 Gbit/s transmission frame, FIG. 32(b) a framer circuit constituting four 100 Gbit/s transmission frames, FIG. 32 (c) a framer circuit constituting two 100 Gbit/s transmission frames and five 40 Gbit/s transmission frames, FIG. 32 (d) a framer circuit constituting three 100 Gbit/s transmission frames and ten 10 Gbit/s transmission frames, for example. Consequently, client signals having various bit rates can be efficiently converted into an optical signal.

Twelfth Embodiment

Multi-flow optical nodes (601 and 602) of this embodiment are provided with multi-flow optical transponders (501 and 502) and wavelength selective switches 81. As features of the multi-flow optical nodes, the number of output ports of the multi-flow optical transponder 502 or the number of output ports of optical branching units 82 connected to an output port of the multi-flow optical transponder 501 is the same as the number of the wavelength selective switches 81, and the output of the multi-flow optical transponder 502 or the output of the optical branching unit 82 is connected to an input of the wavelength selective switch 81.

Figure 33:
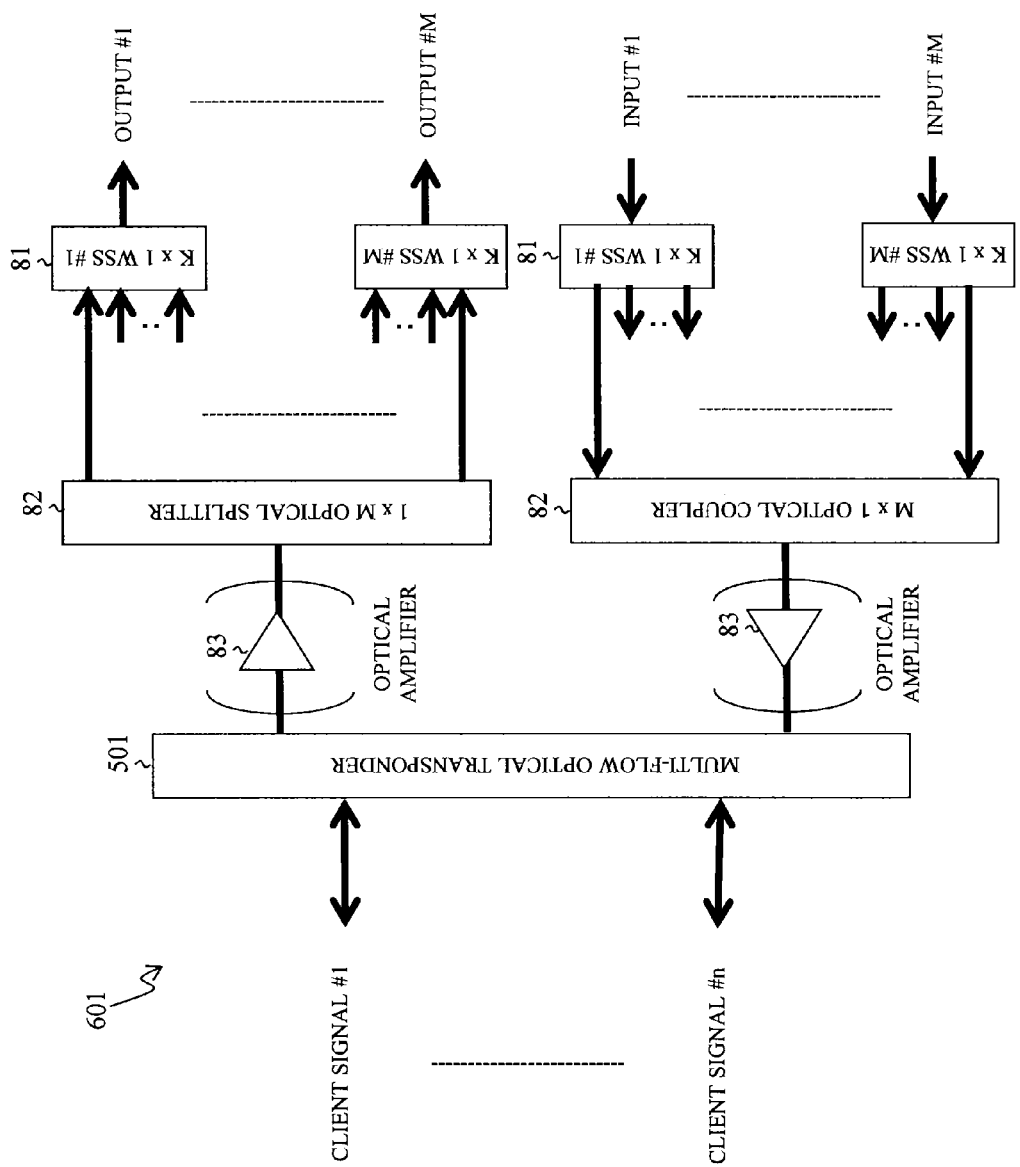
FIG. 33 is a view showing a multi-flow optical node according to the present disclosure.

FIG. 33 is a view showing a constitutional example of a multi-flow optical node 601 of this embodiment. This constitutional example is constituted of the multi-flow optical transponder 501 of FIG. 30, a 1×M optical splitter as the optical branching unit 82 and M of k×1 WSS as the wavelength selective switches 81, which are provided on the transmission side, and an M×1 coupler as the optical branching unit 82 and M of 1×k WSS as the wavelength selective switches 81 which are provided on the reception side. In this case, an optical amplifier 83 may be inserted between the multi-flow optical transponder 501 and the 1×M optical splitter or the M×1 optical coupler. M represents the number of paths of the optical node. On the transmission side, the signal multiplexed by each WSS is sent out to each path. On the reception side, the signal input from each path is branched by WSS and coupled by the M×1 coupler to be input to the multi-flow optical transponder 501.

Figure 34:
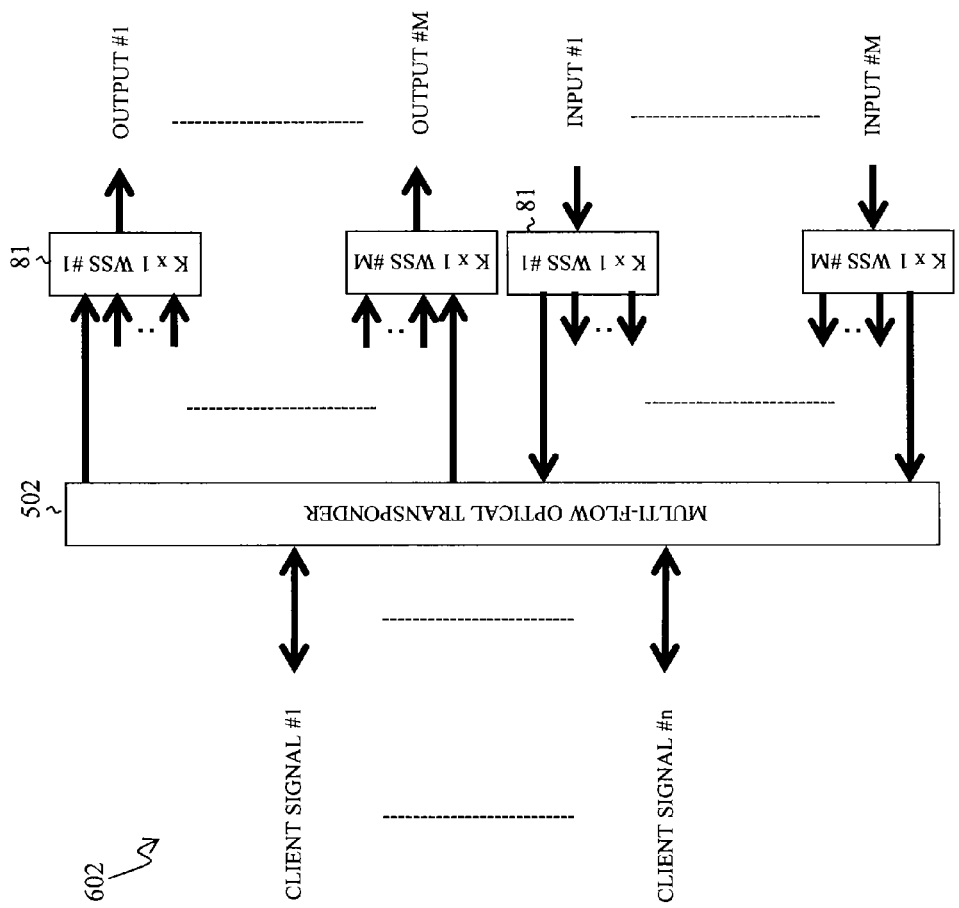
FIG. 34 is a view showing a multi-flow optical node according to the present disclosure.

FIG. 34 is a view showing a constitutional example of a multi-flow optical node 602 of this embodiment. This constitutional example is constituted of the multi-flow optical transponder 502 of FIG. 31, M of k×1 WSS as the wavelength selective switches 81 provided on the transmission side, and M of 1×k WSS as the wavelength selective switches 81 provided on the reception side. The multi-flow optical node 602 has an easier constitution than that of the multi-flow optical node 601 of FIG. 33, and, at the same time, can generate optical paths simultaneously in different paths having the same wavelength from the single multi-flow optical transponder 502.

In order to obtain a multilevel QAM signal, for example, a 64 QAM signal with a single modulator, a high linearity is required for EO conversion characteristics of a driver amplifier for driving a modulator and a modulator. In particular, in a high speed optical transmission system in which the transmission speed is of several ten Gbit/s class, it is difficult to realize such driver amplifier and modulator having a high linearity. Thus, in order to generate the 64 QAM signal, an electrical signal in which in-phase components and orthogonal components are 8 levels is generated by a DA converter, and the optical modulator is driven by the 8 level electrical signal.

In this application, among a plurality of modulators used in the multilevel modulation, a modulator to be unnecessary when a bit rate demand is low has been paid attention, and utilization of an unnecessary modulator has been attempted. In this application, when a light source and an optical switch to be unnecessary when the bit rate demand is high are given to utilize the modulator to be unnecessary when the bit rate demand is low, there occurs a problem that the cost increases in comparison with a conventional transponder.

For example, four capacity variable optical transponders having four wavelengths and a maximum capacity of 100 Gbit/s are supposed, and it is assumed that respective costs of a single light source, a single modulator, and a 4×4 optical switch are 1 unit, 3 units, and 2 units. Since a conventional transponder of 400 Gbit/s is constituted of a single light source and four modulators, the cost is 13 units. Meanwhile, since the transponder of this application is constituted of four light sources, four modulators, and a single 4×4 optical switch, the cost is 18 units, so that the cost increases as a single transponder.

However, although a required bit rate for each wavelength is low, many wavelengths are required, and when a required bit rate for each wavelength increases with the times within a lifetime of an apparatus, the transponder of this application has an effect of equalizing the foundation cost and suppressing an initial foundation cost.

For example, it is assumed that the maximum value of the bit rate required for each wavelength within the lifetime of the apparatus is 400 Gbit/s, and initially, a demand is four wavelengths, for example, 100 Gbit/s in each of four grounds. In this case, in a conventional transponder, four transponders are required, and an initial cost in which 4×13 units=52 units is required. Compared with this, in the capacity variable optical transponder of this application, since an optical signal directed toward four grounds can be generated in a single transponder, the responses by a single transponder are allowed. Accordingly, it is 1×18 units=18 units, and an initial foundation cost can be kept low. After that, when a required bit rate for each wavelength increases to 200 Gbit/s, 300 Gbits, and 400 Gbit/s, the number of the capacity variable optical transponders of this application may be increased one by one. In this case, since the total of the cost increases to 18, 36, 54, and 72 units, conventional transponders are introduced as the third transponder and the successive transponder, so that the total of the cost may be reduced.

INDUSTRIAL APPLICABILITY

As described above, the present disclosure can provide a multi-flow optical transceiver, multi-flow optical transponder, and multi-flow optical node, which can well utilize a bandwidth resource as a network and can keep an initial introduction cost down.

REFERENCE SIGNS LIST 10, 10-1, 10-2, . . . , and 10-N: Wavelength-tunable light source
20, 20': Optical multiplexing/demultiplexing switch
21-1 to 21-4: Input port
22-1 to 22-4: Output port
23-1 to 23-3: Variable multiplexer/demultiplexer 25-1 to 25-4: Tunable filter
30, 30-1, 30-2, . . . , and 30-N: Optical modulator
40, 40', 40": Optical coupling unit
43-1 to 43-4: Variable multiplexer/demultiplexer
50, 50-1, 50-2: Multiple carrier generating portion
60: Polarization beam combiner (PBC)
70: Digital/analog (A/D) converter
71: Client interface
72: Digital signal processing circuit
73: Parallel-serial/serial-parallel conversion circuit
81: Wavelength selective switch
82: Optical branching unit
83: Optical amplifier
301 to 308, 310, and 302-1: Optical transmission portion
351: Optical reception portion
401, 402: Multi-flow optical transceiver
501, 502: Multi-flow optical transponder
601, 602: Multi-flow optical node

The invention claimed is:

1. A multi-flow optical transceiver comprising:
a plurality of wavelength-tunable light sources;
a plurality of optical modulation units which modulates light with an input signal;
an optical multiplexing/demultiplexing switch which couples light from at least one of the wavelength-tunable light sources to at least one of the optical modulation units with any power; and
an optical coupling unit which couples a plurality of lights, modulated by a plurality of the optical modulation units, to at least one waveguide,
wherein the number of the wavelength-tunable light sources is four, the number of the optical modulation units is four, the optical multiplexing/demultiplexing switch includes four input ports, four output ports, and three two-input/two-output variable multiplexers/demultiplexers, the input side of a first variable multiplexer/demultiplexer is connected to a second input port and a third input port, the input side of a second variable multiplexer/demultiplexer is connected to a first input port and one of outputs of the first variable multiplexer/demultiplexer, the input side of a third variable multiplexer/demultiplexer is connected to a fourth input port and the other output of the first multiplexer/demultiplexer, the output side of the second variable multiplexer/demultiplexer is connected to a first output port and a second output port, the output side of the third variable multiplexer/demultiplexer is connected to a third output port and a fourth output port, light from the wavelength-tunable light source is coupled to each of the input ports of the optical multiplexing/demultiplexing switch, and the optical modulation units are connected to the respective output ports of the optical multiplexing/demultiplexing switch.

2. The multi-flow optical transceiver according to claim 1, further comprising: a digital/analog conversion unit which applies digital/analog conversion to the input signal and inputs the digital/analog converted signal to the optical modulation unit.

3. The multi-flow optical transceiver according to claim 1, wherein the optical coupling unit is a switch with an optical distribution function having a plurality of optical output ports.

4. A multi-flow optical transponder comprising:
at least one client interface;
a reconfigurable digital signal processing unit connected to the client interface;
a parallel-serial/serial-parallel conversion unit which is connected to the digital signal processing unit; and
the multi-flow optical transceiver according to claim 1, which is connected to the parallel-serial/serial-parallel conversion unit.

5. A multi-flow optical node, comprising:
the multi-flow optical transponder according to claim 4; and
a plurality of wavelength selective switches,
wherein the number of output ports of the multi-flow optical transponder or the number of output ports of optical branching units connected to the output port of the multi-flow optical transponder is the same as the number of the wavelength selective switches, and an output of the multi-flow optical transponder or an output of the optical branching unit is connected to an input of the wavelength selective switch.

6. A multi-flow optical transponder comprising:
at least one client interface;
a reconfigurable digital signal processing unit connected to the client interface;
a parallel-serial/serial-parallel conversion unit which is connected to the digital signal processing unit; and
the multi-flow optical transceiver according to claim 2, which is connected to the parallel-serial/serial-parallel conversion unit.

7. A multi-flow optical node, comprising:
the multi-flow optical transponder according to claim 6; and
a plurality of wavelength selective switches,
wherein the number of output ports of the multi-flow optical transponder or the number of output ports of optical branching units connected to the output port of the multi-flow optical transponder is the same as the number of the wavelength selective switches, and an output of the multi-flow optical transponder or an output of the optical branching unit is connected to an input of the wavelength selective switch.

8. A multi-flow optical transponder comprising:
at least one client interface;
a reconfigurable digital signal processing unit connected to the client interface;
a parallel-serial/serial-parallel conversion unit which is connected to the digital signal processing unit; and
the multi-flow optical transceiver according to claim 3, which is connected to the parallel-serial/serial-parallel conversion unit.

9. A multi-flow optical node, comprising:
the multi-flow optical transponder according to claim 8; and
a plurality of wavelength selective switches,
wherein the number of output ports of the multi-flow optical transponder or the number of output ports of optical branching units connected to the output port of the multi-flow optical transponder is the same as the number of the wavelength selective switches, and an output of the multi-flow optical transponder or an output of the optical branching unit is connected to an input of the wavelength selective switch.

* * * * *